US010924440B2

(12) United States Patent
Ma

(10) Patent No.: US 10,924,440 B2
(45) Date of Patent: Feb. 16, 2021

(54) METHOD AND APPARATUS FOR PROMPTING WORK STATUS

(71) Applicant: Alibaba Group Holding Limited, Grand Cayman (KY)

(72) Inventor: Xinglin Ma, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 20 days.

(21) Appl. No.: 15/865,921

(22) Filed: Jan. 9, 2018

(65) Prior Publication Data

US 2018/0131649 A1 May 10, 2018

Related U.S. Application Data

(63) Continuation of application No. PCT/CN2016/087466, filed on Jun. 28, 2016.

(30) Foreign Application Priority Data

Jul. 10, 2015 (CN) .......................... 2015 1 0405353

(51) Int. Cl.
*H04L 12/58* (2006.01)
*H04L 29/08* (2006.01)

(52) U.S. Cl.
CPC ............ *H04L 51/043* (2013.01); *H04L 51/00* (2013.01); *H04L 67/24* (2013.01); *H04L 51/14* (2013.01)

(58) Field of Classification Search
CPC ....... H04L 51/043; H04L 51/00; H04L 51/14; H04L 67/24
See application file for complete search history.

(56) References Cited

U.S. PATENT DOCUMENTS

2003/0108173 A1* 6/2003 Gray ................. H04M 3/42374
379/201.02
2003/0133544 A1* 7/2003 Wasmeier ............... G06F 8/314
379/88.22

(Continued)

FOREIGN PATENT DOCUMENTS

CN 1992618 7/2007
CN 101547164 9/2009

(Continued)

OTHER PUBLICATIONS

Translation of International Search Report from corresponding PCT application No. PCT/CN2016/087466 dated Sep. 26, 2016, 2 pages.

(Continued)

*Primary Examiner* — Azizul Choudhury
(74) *Attorney, Agent, or Firm* — Lee & Hayes, P.C.

(57) ABSTRACT

A method and an apparatus for prompting a work status are disclosed. The method may include obtaining a work status of a preset contact person in an instant communication application; detecting that a preset function page of the instant communication application is triggered; and presenting the work status of the preset contact person in the preset function page if the preset function page is related to the preset contact person. Through the technical solutions of the present application, a work status of a preset contact person can be presented in an instant communication application, to help a user to view and understanding thereof in time.

20 Claims, 22 Drawing Sheets

(56) References Cited

U.S. PATENT DOCUMENTS

| | | | |
|---|---|---|---|
| 2003/0193558 A1* | 10/2003 | Doss | H04N 7/147 348/14.01 |
| 2005/0166154 A1* | 7/2005 | Wilson | G06F 3/0481 715/751 |
| 2006/0026252 A1* | 2/2006 | Caspi | G06Q 10/107 709/207 |
| 2006/0167991 A1* | 7/2006 | Heikes | H04L 51/04 709/204 |
| 2006/0179410 A1* | 8/2006 | Deeds | H04L 51/04 715/750 |
| 2007/0143415 A1 | 6/2007 | Daigle | |
| 2007/0233291 A1* | 10/2007 | Herde | G06Q 10/02 700/91 |
| 2008/0201437 A1* | 8/2008 | Ludwig | H04L 51/04 709/206 |
| 2009/0083382 A1* | 3/2009 | Rosenberg | G06F 15/16 709/206 |
| 2009/0100171 A1* | 4/2009 | Haynes | G06F 15/173 709/224 |
| 2011/0081920 A1* | 4/2011 | Hung | G06Q 10/109 455/456.3 |
| 2014/0280530 A1* | 9/2014 | Fremlin | H04L 67/306 709/204 |
| 2015/0142835 A1* | 5/2015 | Jain | G06F 16/245 707/755 |
| 2016/0217429 A1* | 7/2016 | Lau | G06Q 10/107 |

FOREIGN PATENT DOCUMENTS

| | | |
|---|---|---|
| CN | 102347911 | 2/2012 |
| CN | 104283766 | 1/2015 |
| CN | 105072018 | 11/2015 |
| JP | HEI07168889 A | 7/1995 |
| JP | 2002269307 A | 9/2002 |
| JP | 2003283666 A | 10/2003 |
| JP | 2010181974 A | 8/2010 |
| JP | 2013218511 A | 10/2013 |

OTHER PUBLICATIONS

Translation of Written Opinion from corresponding PCT application No. PCT/CN2016/087466 dated Sep. 26, 2016, 6 pages.

Translation of CN Office Action from Corresponding CN Application No. 201510405353.4 dated Jul. 10, 2015, a counterpart foreign application for U.S. Appl. No. 15/865,921, 10 pages.

Translation of CN Search Report from Corresponding CN Application No. 201510405353.4 dated Jul. 10, 2015, a counterpart foreign application for U.S. Appl. No. 15/865,921, 1 page.

Japanese Office Action dated Dec. 17, 2019, for Japanese Patent Application No. 2018-500642, a counterpart foreign application of the U.S. Appl. No. 15/865,921, 14 pages.

* cited by examiner

METHOD AND APPARATUS FOR PROMPTING WORK STATUS

CROSS REFERENCE TO RELATED PATENT APPLICATIONS

This application claims priority to and is a continuation of PCT Patent Application No. PCT/CN2016/087466 filed on 28 Jun. 2016, and is related to and claims priority to Chinese Patent Application No. 201510405353.4, filed on 10 Jul. 2015, entitled "Method and Apparatus for Prompting Work Status," which are hereby incorporated by reference in their entirety.

TECHNICAL FIELD

The present application relates to the technological field of instant communication, and particularly, to methods and apparatuses for prompting work status.

BACKGROUND

Management personnel of a company usually needs to understand work statuses of employees of the company to get hold of running conditions of the company. Moreover, the employees of the company also need to understand work statuses of each other, for facilitating mutual communications, and for avoiding the inability of achieving smooth communications, which affects normal processing of a work task due to failing to understand the work statuses of the others.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Accordingly, the present application provides a method and an apparatus for prompting a work status, which can present a work status of a preset contact person in an instant communication application, to facilitate a user to read and understand thereof in time.

In order to achieve the above goal, the present application provides the following technical solutions.

In implementations, a method for prompting a work status is provided, which includes obtaining a work status of a preset contact person in an instant communication application; detecting that a preset function page of the instant communication application is triggered; and presenting the work status of the preset contact person in the preset function page if the preset function page is related to the preset contact person.

In implementations, a method for prompting a work status is provided, which includes individually obtaining a work status of each user; and according to a preset contact person that is set by a user in an instant communication application, pushing the work status of the preset contact person to the user, to enable a preset function page in the instant communication application to present the work status of the preset contact person that is related when the preset function page is triggered.

In implementations, an apparatus for prompting a work status is provided, which includes an acquisition unit that obtains a work status of a preset contact person in an instant communication application; a detection unit that detects a preset function page of the instant communication application being triggered; and a display unit that presents the work status of the preset contact person in the preset function page if the preset function page is related to the preset contact person.

In implementations, an apparatus for prompting a work status is provided, which includes an acquisition unit that individually obtains a work status of each user; and a pushing unit that, according to a preset contact person that is set by a user in an instant communication application, pushes the work status of the preset contact person to the user, to enable a preset function page in the instant communication application to present the work status of the preset contact person that is related when the preset function page is triggered.

As can be seen from the above technical solutions, the present application can display a work status of a preset contact person in a preset function page of an instant communication application by actively obtaining the work status, to enable a user to view and understand thereof in time. Furthermore, displaying a work status in an instant communication application achieves a high efficient management of company conditions (i.e., work statuses of company employees) under a mobile environment, without the need of repetitive switching between application environments and pages between an instant communication application in a mobile office and a management system in a company, for example. This helps simplifying user operations and improves an efficiency of management of the company.

DETAILED DESCRIPTION

Figure 1A:
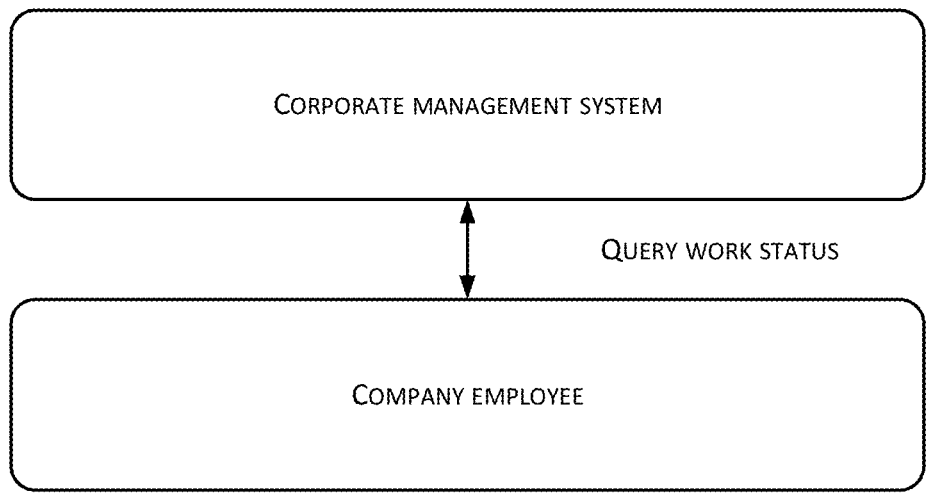
FIG. 1A is a schematic diagram of viewing a work status of a company employee in a related technology.

In a related technology, a process of operations for viewing a work status of a company employee is very inconvenient. For example, FIG. 1A is a schematic diagram of viewing a work status of a company employee in the related technology. As shown in FIG. 1A, a company user needs to log into a corporate management system that is internal to the company, in order to be allowed to view a work status of a certain company user, such as normal working, on a business trip, or on vacation, etc., through a time-off subsystem, an attendance subsystem, for example, in the corporate management system.

Nevertheless, a corporate management system inside a company generally has disadvantages such as privilege restrictions, complicated operations, and an overly number of functions. For the need of querying a work status, a process of operations thereof is overly complicated.

Figure 1B:
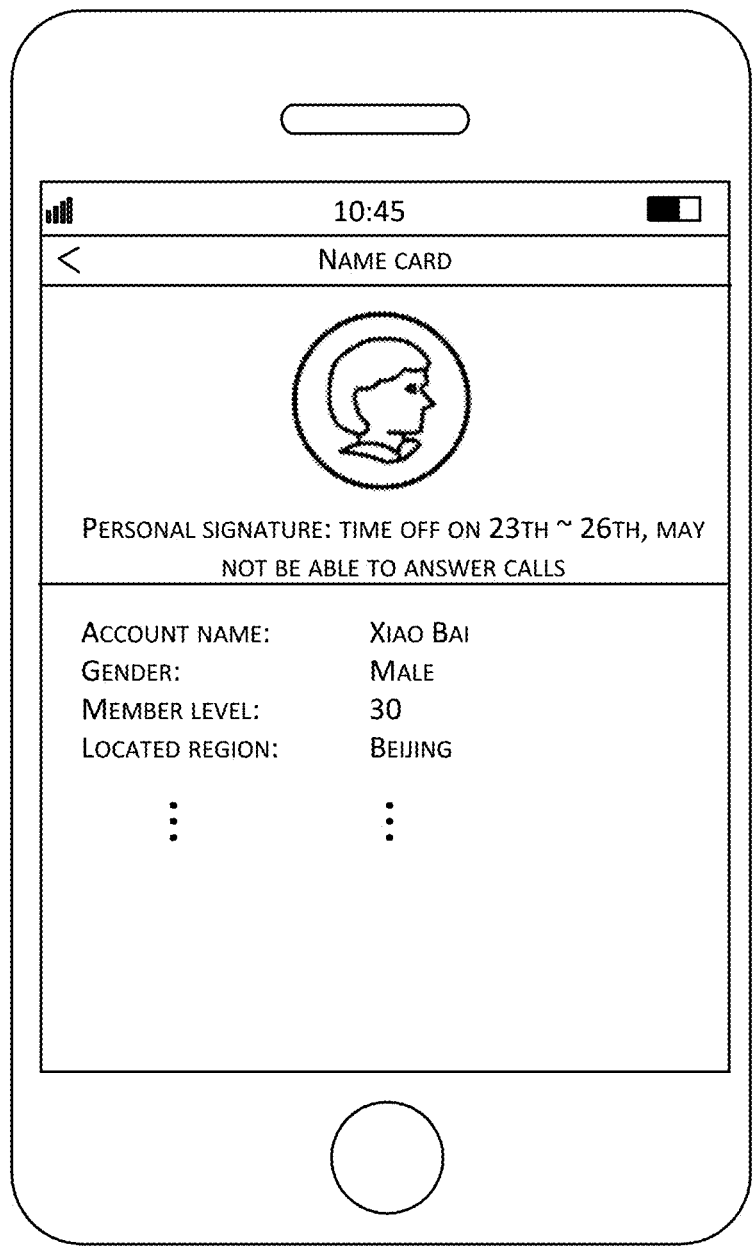
FIG. 1B is another schematic diagram of an interface of viewing a work status of a company employee in the related technology.

FIG. 1B is a schematic diagram of an interface for querying and viewing a work status of a company employee. As shown in FIG. 1B, company employees can mutually add each other as a contact person of an instant communication application. By entering an information interface of another company employee such as "Xiao Bai", i.e., through content of "personal signature", a work status of that company employee can be known. For example, a personal signature of "having a time off during 23th-26th, and no call can be answered" in FIG. 1B represents that a work status of "Xiao Bai" during that corresponding time period is "time off".

Although a process of operations in the example as shown in FIG. 1B is much simpler than the example based on the corporate management system as shown in FIG. 1A, "personal signature" needs to be filled in by a company employee. Content may not be updated timely for reasons such as too many works, forgetting. Furthermore, as the content is edited by the company employee himself/herself, a format of the content is not fixed, such that individualized filled-in content may not difficult for other company employee to understand quickly.

Therefore, the present application solves the above technical problems that exist in the related technology by improving a method of prompting a work status. The following embodiments are provided for describing the present application in further detail.

Figure 2:
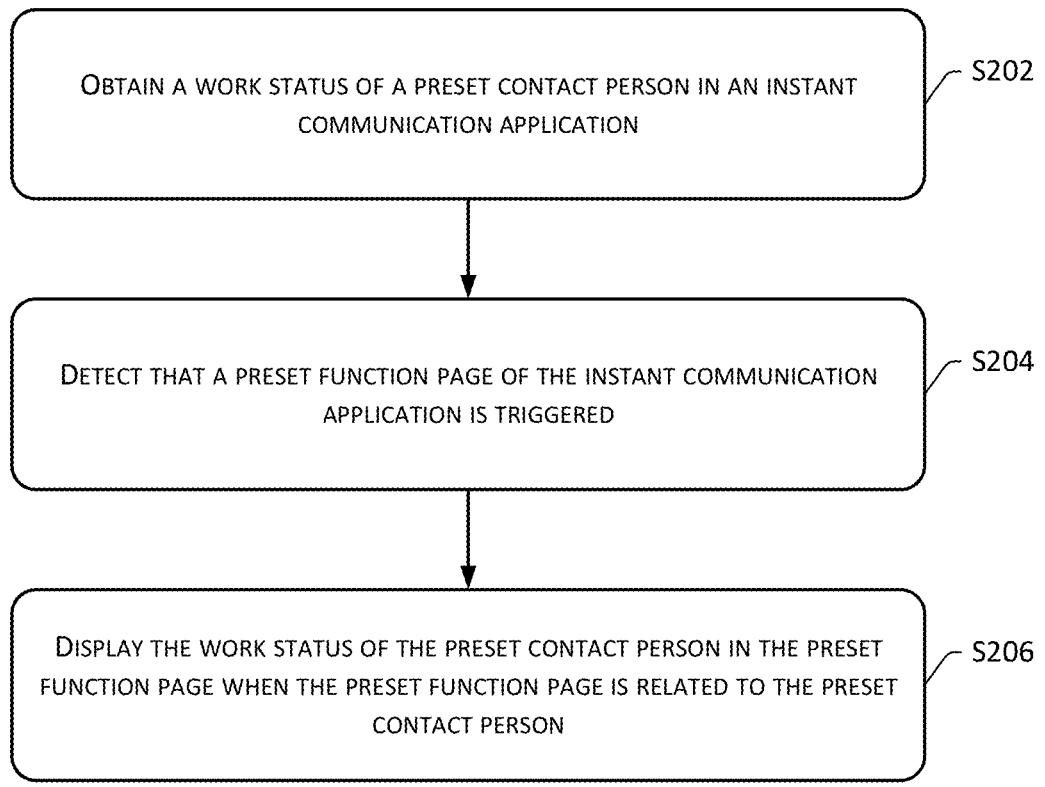
FIG. 2 is a flowchart of a method for prompting a work status from a mobile device end in accordance with an exemplary embodiment of the present application.

FIG. 2 is a flowchart of a method 200 of prompting a work status from a mobile device side in accordance with an exemplary embodiment of the present application. As shown in FIG. 2, the method 200 is applied in a mobile device, and may include the following operations.

S202 obtains a work status of a preset contact person in an instant communication application.

In the present embodiment, an instant communication application may be any application program that can implement "instant communications", which may be an enterprise instant messaging (EIM), for example, an enterprise instant messaging—DingTalk.

S204 detects that a preset function page of the instant communication application is triggered.

In the present embodiment, a preset function page may be any page of the instant communication application, such as a contact list page, a contact information page, etc., which may be set up by default, or set up by a user according to an actual need.

S206 displays the work status of the preset contact person in the preset function page when the preset function page is related to the preset contact person.

Figure 3:
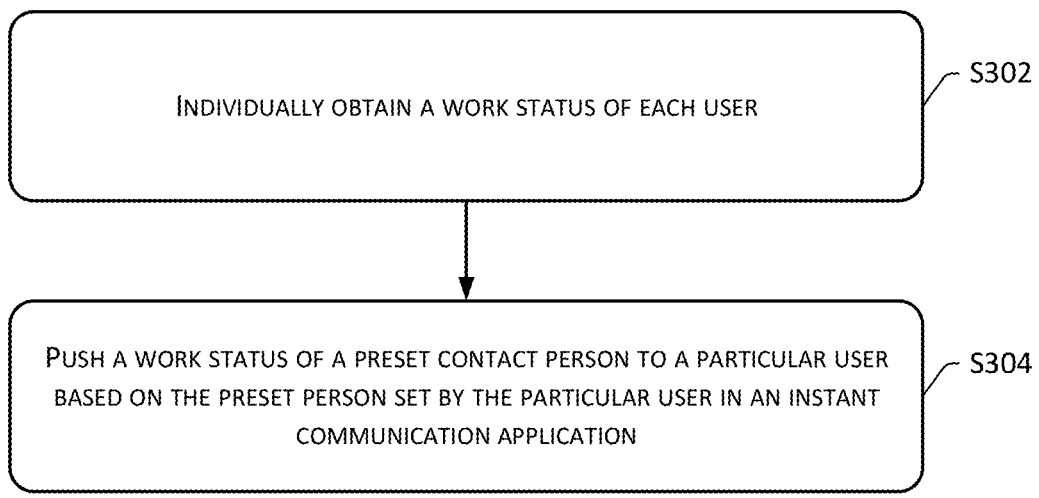
FIG. 3 is a flowchart of a method for prompting a work status from a server end in accordance with an exemplary embodiment of the present application.

Correspondingly, FIG. 3 is a flowchart of a method 300 of prompting a work status from a server side in accordance with an exemplary embodiment of the present application. As shown in FIG. 3, the method 300 is applied in a server, and may include the following operations.

S302 individually obtains a work status of each user.

S304 pushes the work status of a preset contact person to a particular user based on the preset person set by the particular user in an instant communication application, to enable a preset function page of the instant communication application to display the work status of the preset person that is related when the preset function page is triggered by the particular user.

As can be seen from the above embodiment, the present application actively obtains a work status of a preset contact person, and can display the work status in a preset function page of an instant communication application, to facilitate a user to view and understand thereof in time. Furthermore, displaying a work status in an instant communication application achieves a high efficient management of company conditions (i.e., work statuses of company employees) under a mobile environment, without the need of repetitive switching between application environments and pages between an instant communication application in a mobile office and a management system in a company, for example. This helps simplifying user operations and improves an efficiency of management of the company.

By actively obtaining a work status of a company employee who acts as a "preset contact person" at S202 in FIGS. 2 and S302 in FIG. 3, that company employee does not need to fill in content of the work status through "personal signature" as shown in the example of FIG. 1B initiatively. The "preset contact person" may be all contact persons, any one or more contact persons set by a current user, contact persons of a same company or a same department of the current user, etc. The user or the instant communication application can set up on its own. The present application does not impose any limitation thereon.

As an illustrative embodiment, corporate management events in management subsystems can be obtained through preset data channels between an instant communication application and the management subsystems of a company under various dimensions. A corresponding work status can then be determined based on a corporate management event related to a preset contact person.

Figure 4A:
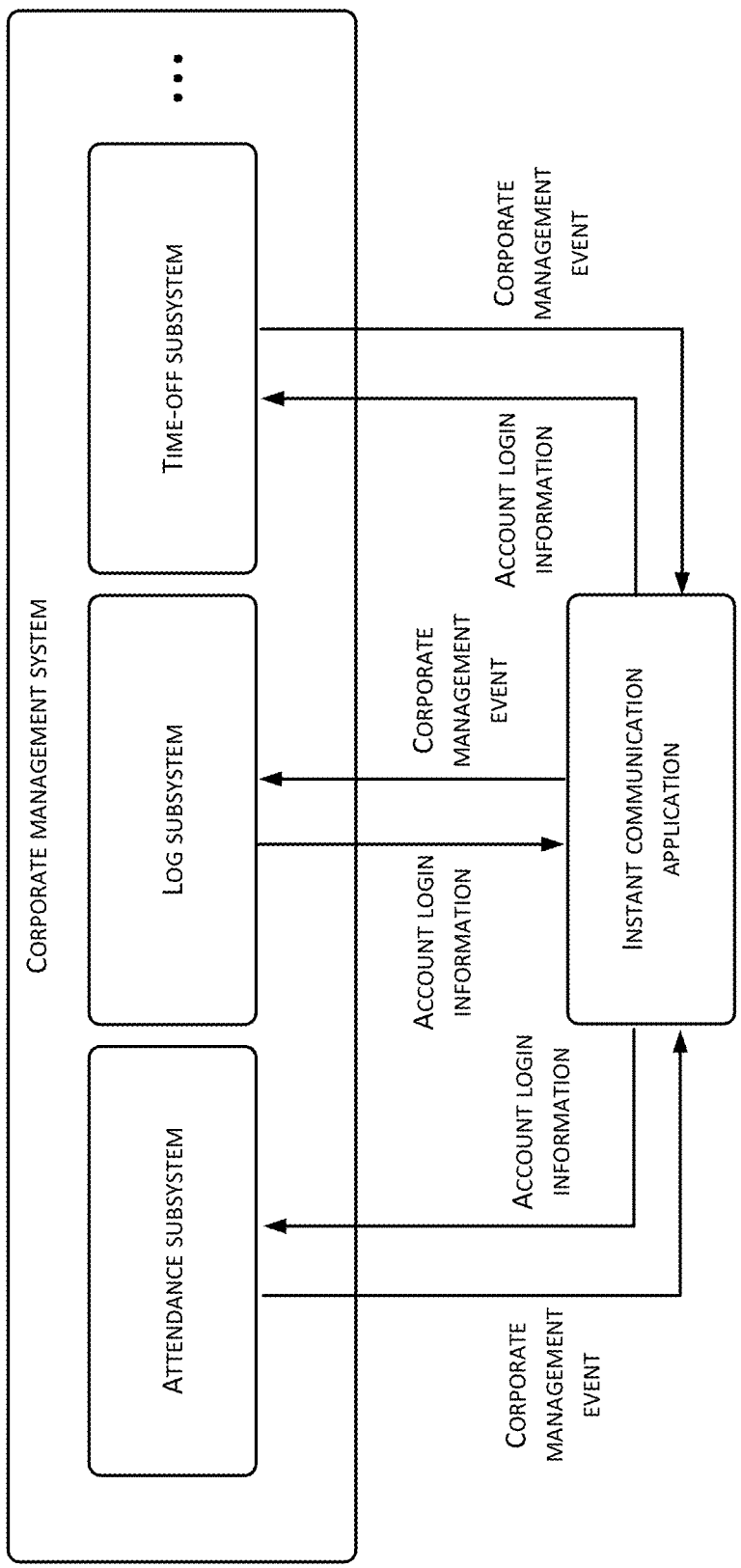
FIGS. 4A-4B are schematic diagrams of obtaining a work status of a company employee in accordance with an exemplary embodiment of the present application.

For example, as shown in FIG. 4A, through interactions of an instant communication application with a variety of management subsystems such as an attendance subsystem, a log subsystem and a time-off subsystem, a work status of any one company employee can be determined after the instant communication application combines and organizes corporate management events obtained from the variety of management subsystems. For example, based on an attendance condition of a company employee, information such as whether a work status of the company employee is normal working or off-working, a working place, etc., can be known. Alternatively, based on a time-off condition of a company employee, whether a work status of the company employee is normal working or taking a time off, on a business trip, on a off-shift, etc., can be known.

Therefore, corporate management events are actively obtained by an instant communication application, and are analyzed to obtain work statuses of company employees without the need of individually logging into a corporate management system and various management subsystems thereof. This thus simplifies the complexity of operations for viewing a work status, and help improving the work efficiency.

Figure 4B:
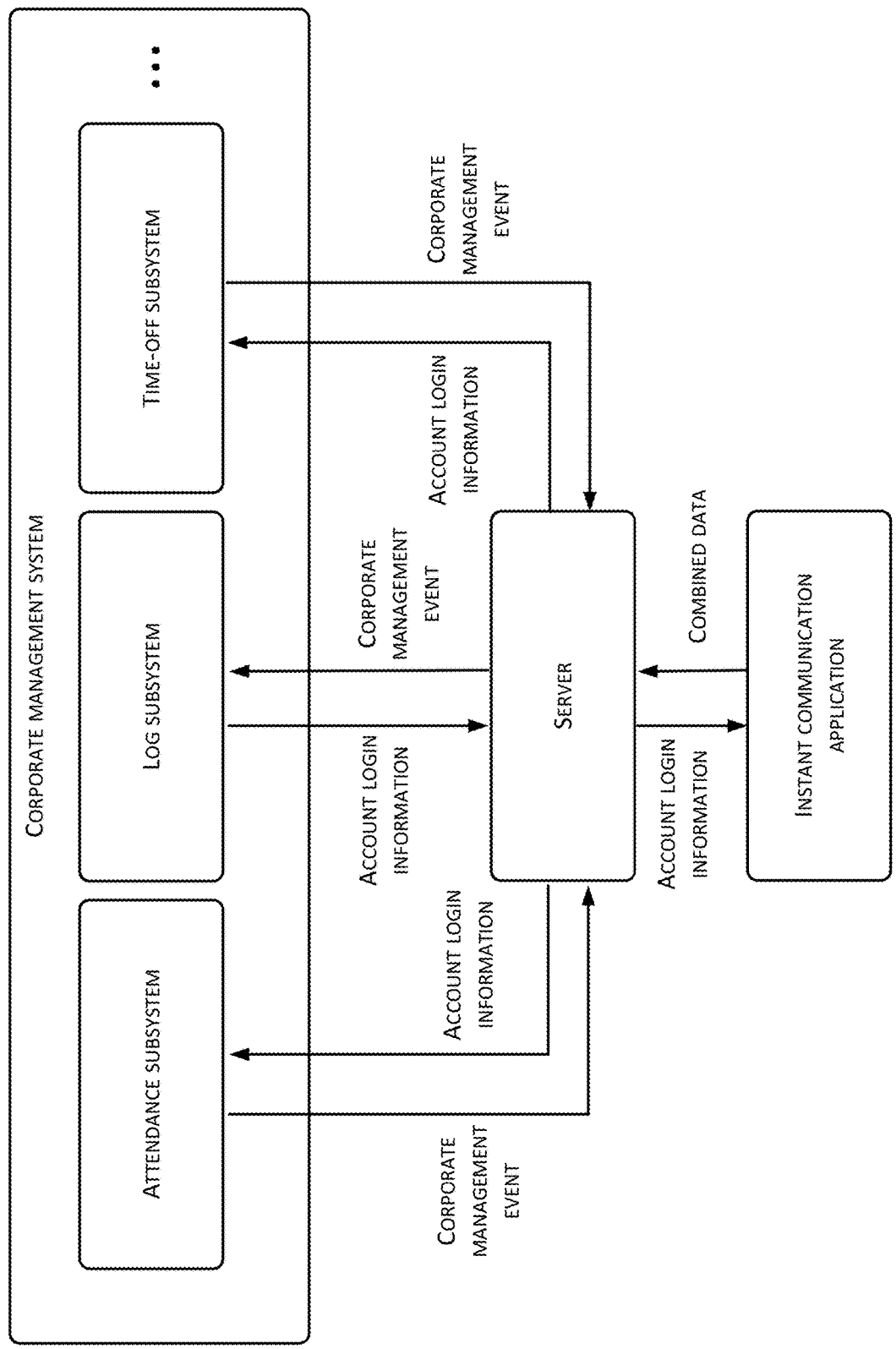

As another illustrative embodiment, a predefined data channel of "a management subsystem—a server—an instant communication application" may be established. As shown in FIG. 4B, the server obtains corporate management events in management subsystems through predefined data channels with the management subsystems of a company under various dimensions, and determines a corresponding work status based on corporate management event(s) related to each user. The server then pushes the work status to the instant communication application. This embodiment is similar to the embodiment shown in FIG. 4A, but interfacing and data acquisition with the management subsystems is conducted by the server, which helps improving the data security. Interfacing with the instant communication application is conducted by the server, which achieves a final display of the work status.

As another illustrative embodiment, the server determines a corresponding work status based on an examination and approval result of a company examination and approval event initiated by each user. Correspondingly, the instant communication application can receive a work status of a preset contact person from a preset server. The work status is obtained by the preset server based on a corporate examination and approval event initiated by the preset contact person.

Figure 5:
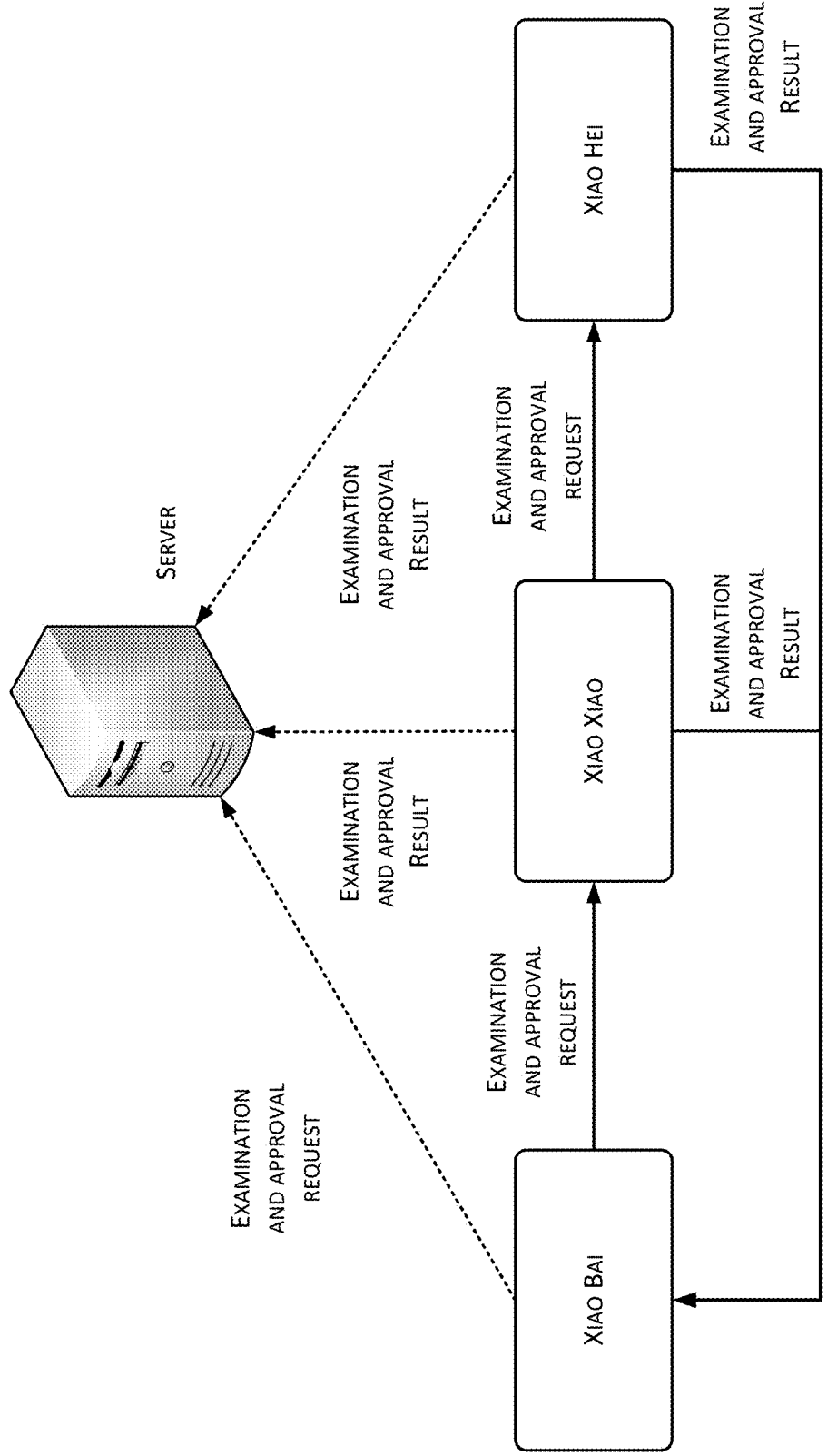
FIG. 5 is a schematic diagram of obtaining a work status of a company employee in accordance with another exemplary embodiment of the present application.
Figure 6:
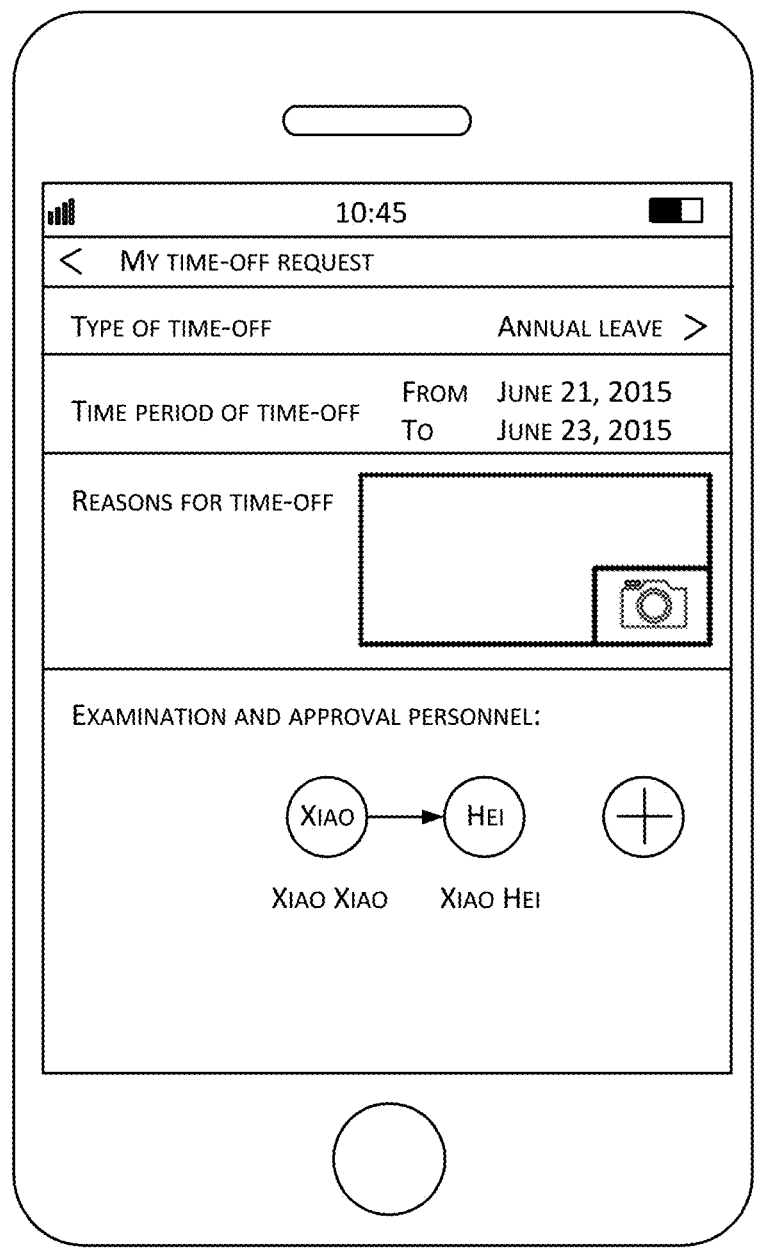
FIG. 6 is a schematic diagram of an interface of creating a company examination and approval event in accordance with an exemplary embodiment of the present application.
Figure 7:
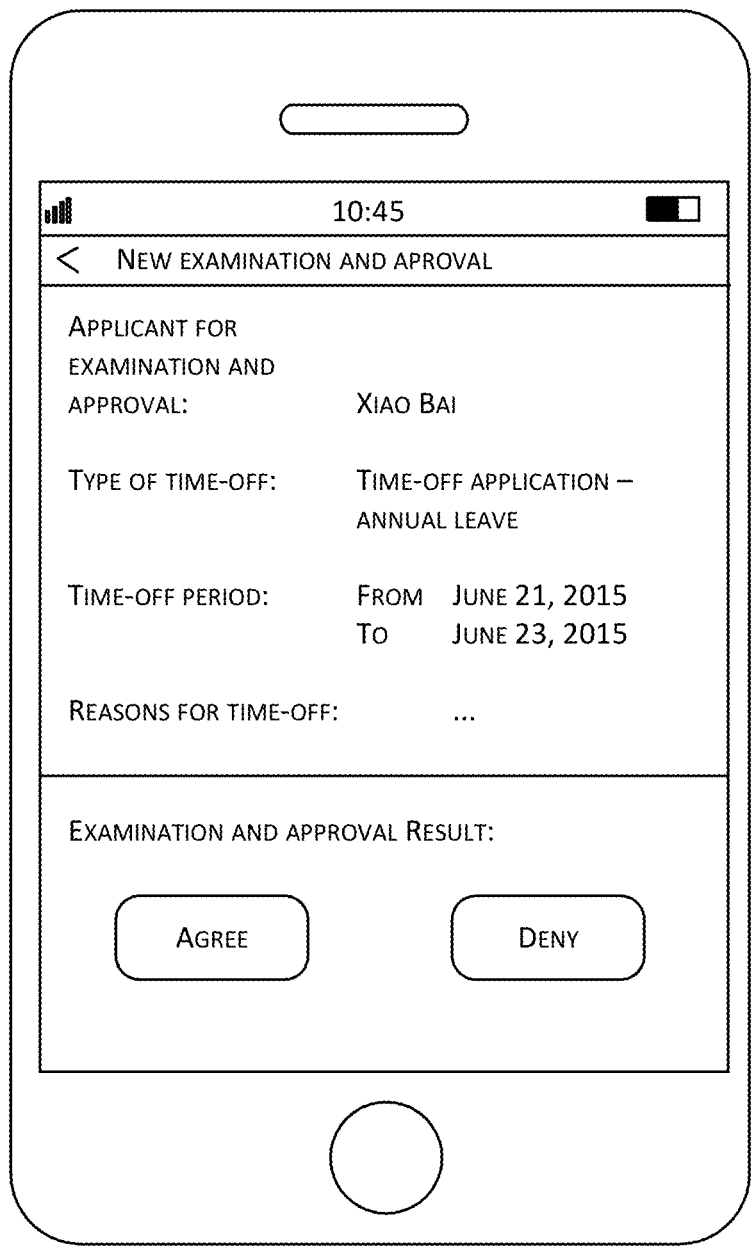
FIG. 7 is a schematic diagram of an interface of processing a company examination and approval event in accordance with an exemplary embodiment of the present application.

As shown in FIG. 5, a company examination and approval event is assumed to be initiated by a user "Xiao Bai", and the company examination and approval event is examined and processed by users "Xiao Xiao" and "Xiao Hei", and an examination and approval result is returned to the user "Xiao Bai". As shown in FIG. 6, "Xiao Bai" is assumed to initiate an examination and approval request for an "annual leave" through a management page of examination and approval on a mobile device, and a time period of the leave is a total of 3 days "from Jun. 21, 2015 to Jun. 23, 2015". After filling in a corresponding reason for the leave, a corresponding examination and approval request is generated, and sent to a corresponding examining and approving person, i.e., "Xiao Xiao". "Xiao Xiao" can view the examination and approval request initiated by "Xiao Bai" at the management page of examination and approval as shown in FIG. 7, and perform processing of the examination and approval request by triggering a button of "agree" or "deny" in the page. After "Xiao Xiao" completes the processing of the examination and approval, "Xiao Hei" continues to perform the processing of the examination and approval at the management page of examination and approval similar to the one shown in FIG. 7, to finally complete the processing of the examination and approval. The management page of examination and approval as shown in FIG. 6 or FIG. 7 may be positioned in the instant communication application, or may be a separate function page. The present application does not have any limitation thereon.

In the above examination and approval process, requests for examination and approval, and results of the examination and approval among users can all be transmitted and relayed by a server. Alternatively, when the users directly send data such as the requests for examination and approval, and results of the examination and approval between each other through a point-to-point means, the server may also be informed at the same time. Therefore, the server can know a work status of a corresponding user after obtaining a request for examination and approval, and a corresponding result of the examination and approval. For example, when the request for the leave submitted by "Xiao Bai" is approved, this represents that a work status of "Xiao Bai" in a time period "from Jun. 21, 2015 to Jun. 23, 2015" is a status indicating the leave.

Apparently, the above embodiments are merely used as examples. Any method that actively obtains a work status can also be applied in the technical solutions of the present application, and the present application does not have any limitation thereon.

Figure 8:
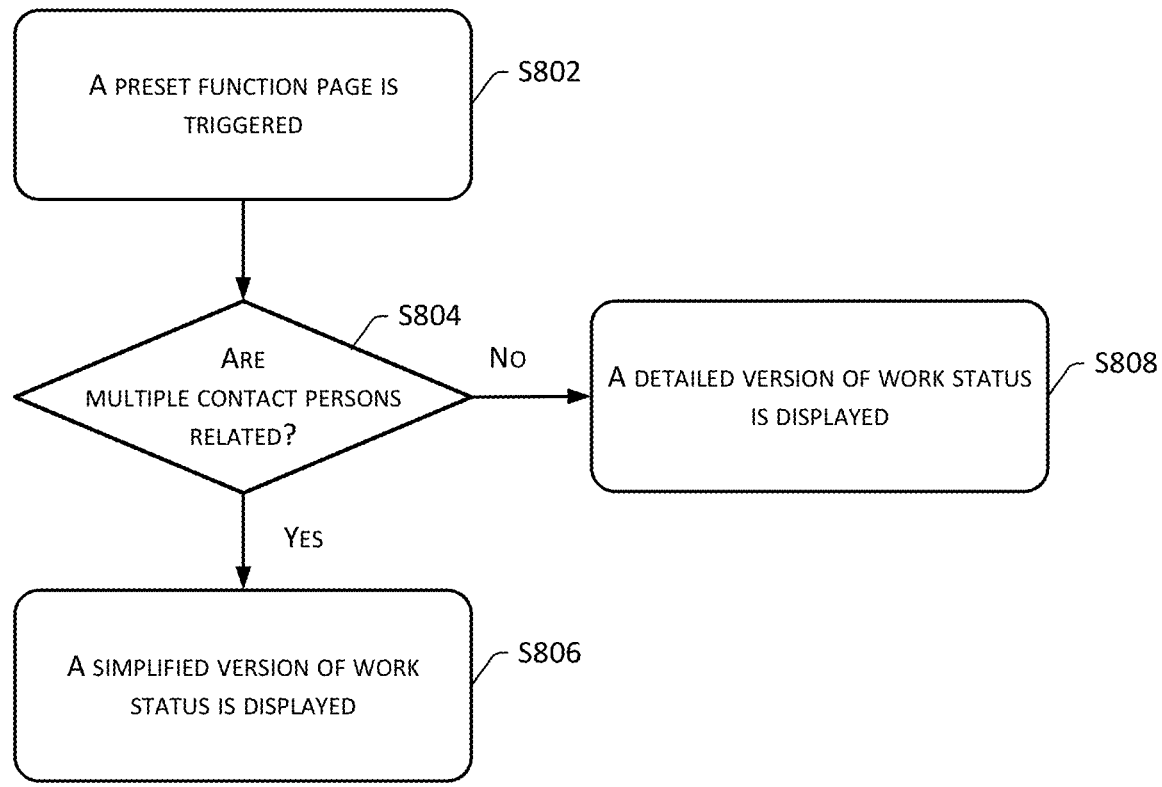
FIG. 8 is a flowchart of another method for prompting a work status in accordance with an exemplary embodiment of the present application.

FIG. 8 is a flowchart of another method 800 of prompting a work status in accordance with an exemplary embodiment of the present application. The method 800 is applied in a mobile device, and may include the following operations.

S802 detects that a preset function page of an instant communication application is triggered.

S804 determines whether the preset function page is related to multiple contact persons, and enters into S806 if affirmative, or enters into S808 otherwise.

S806 displays a simplified version of a work status in associated regions of the contact persons if the preset function page is related to the multiple contact persons.

Figure 9A:
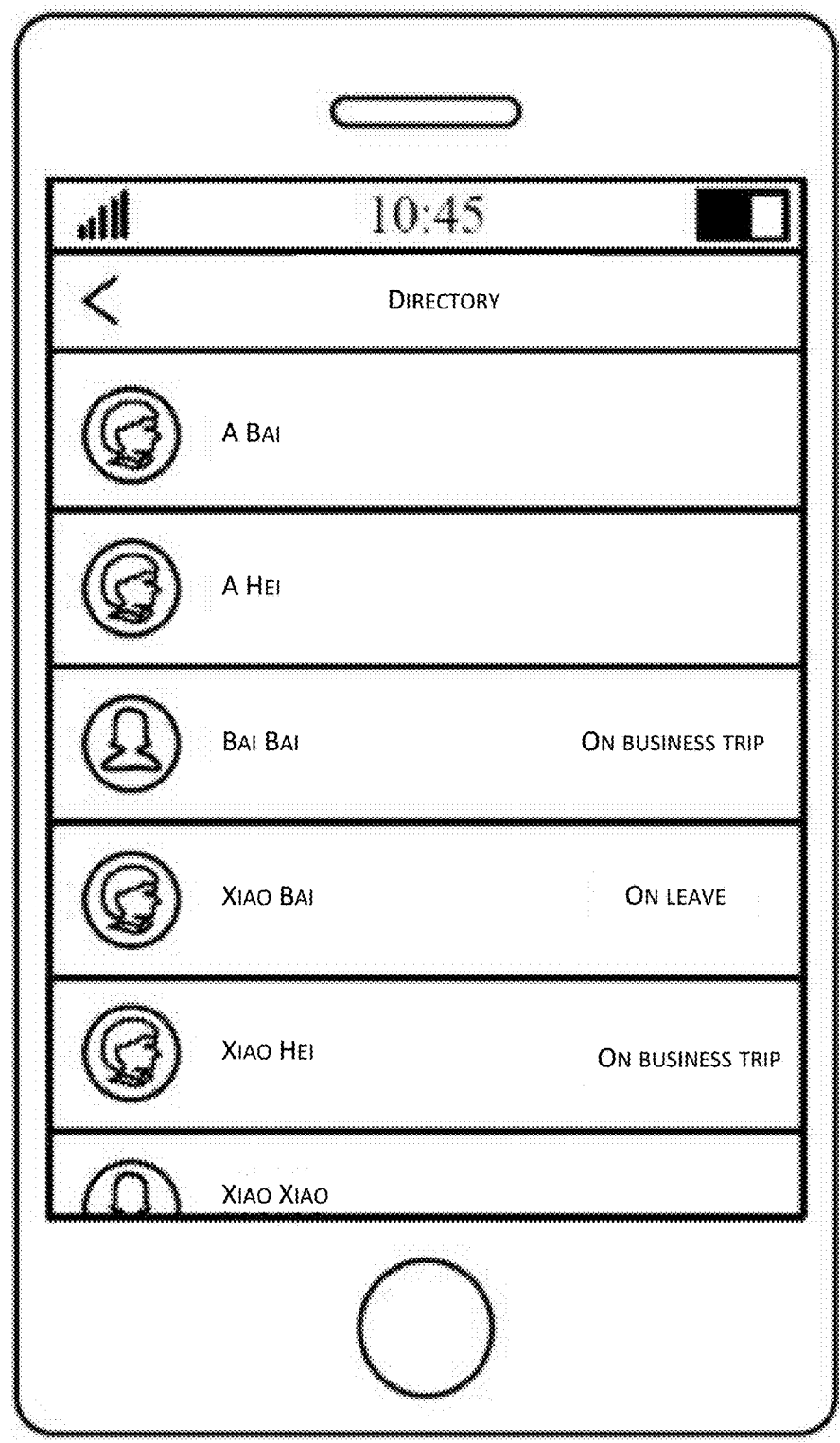
FIG. 9A is a schematic diagram of an interface displaying a simplified work status of a company employee in accordance with an exemplary embodiment of the present application.

In the present embodiment, when the preset function page that is triggered is a contact list page as shown in FIG. 9A, since the page includes information such as names and images of multiple contact persons at the same time, a display area of a respective region associated with each contact person (a region that is only related to the respective contact person and does not lead to confusion with other contact persons) is apparently small. Therefore, a display of a work status is achieved in a limited area of display by presenting a simplified version of the work status.

For example, as shown in FIG. 9A, simple work statuses such as "on a business trip" and "on leave", etc., are displayed for company employees such as "Bai Bai" and "Xiao Bai", etc., and corresponding time information, for example, is not displayed. Furthermore, for normal work statuses, corresponding work statuses for "A Bai", "A Hei", etc., may be omitted as shown in FIG. 9A, and only abnormal statuses such as "on a business trip", "on leave", for example, are displayed. This helps a user to quickly understand the abnormal statuses. Apparently, normal work statuses may be displayed using information such as "in normal working", etc. The present application does not have any limitation thereon.

S808 displays a detailed work status in a preset region of the preset function page when the preset function page is only related to the preset contact person.

Figure 9B:
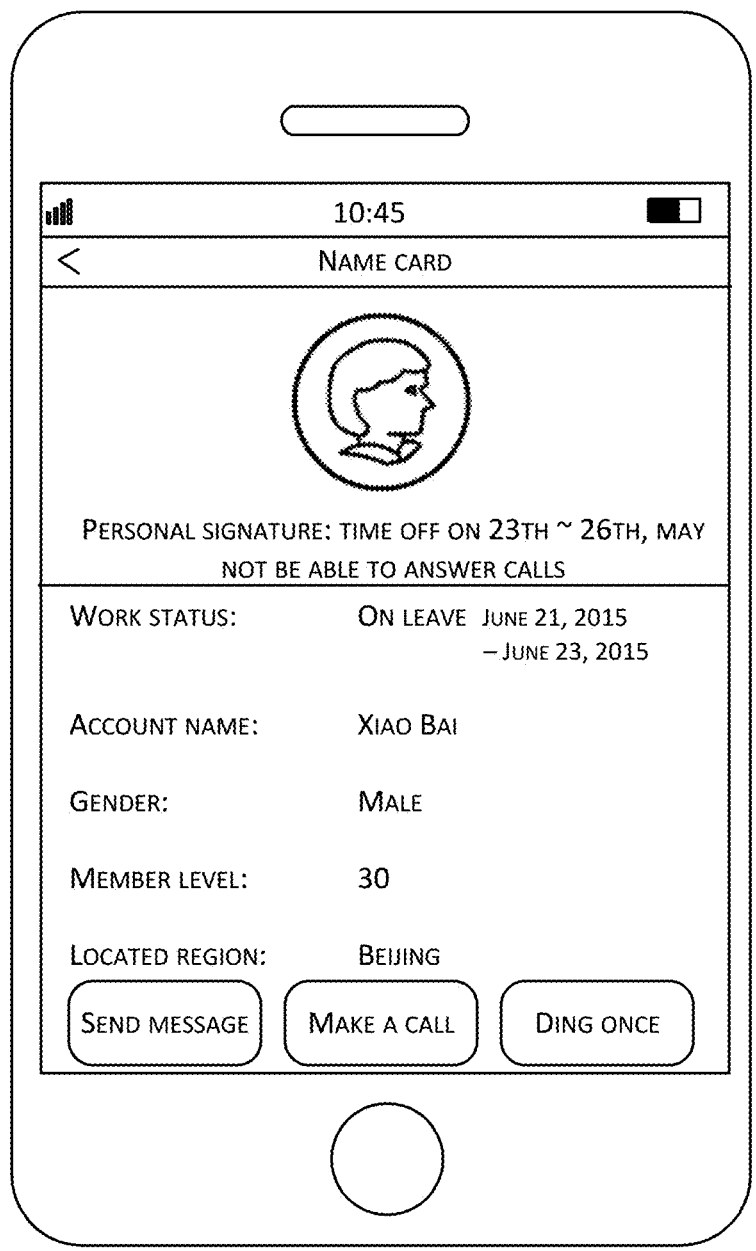
FIG. 9B is a schematic diagram of an interface displaying a detailed work status of a company employee in accordance with an exemplary embodiment of the present application.

In the present embodiment, when the preset function page that is triggered is an information page for "Xiao Bai" as shown in FIG. 9B, the page is only used for presenting information of "Xiao Bai", without any risk of confusing with information of other contact persons. Furthermore, since an area of a display region is large, a user can fully understand various details of a work status by displaying a detailed version of the work status.

The detailed version of the work status may include "work status: on leave" as shown in FIG. 9B, and may also include supplementary information related to the work status. The supplementary information may include at least one of the following: a time period for maintaining the status, a place of occurrence for the status, a proxy contact person. Apparently, the present application does not have any limitation on types of supplementary information.

Apparently, in the foregoing embodiments, pages such as "contact list", "data information", etc., are only used as examples. The embodiments of the present application can apparently be applied in more scenarios. For example, when a group message is sent using an enterprise instant communication application "DingTalk", a sending party can view conditions of reading the message by receiving parties (group members, who act as the receiving parties, are assumed to be company employees A, B, C, D and E respectively) after completing the sending of the group message.

Figure 10:
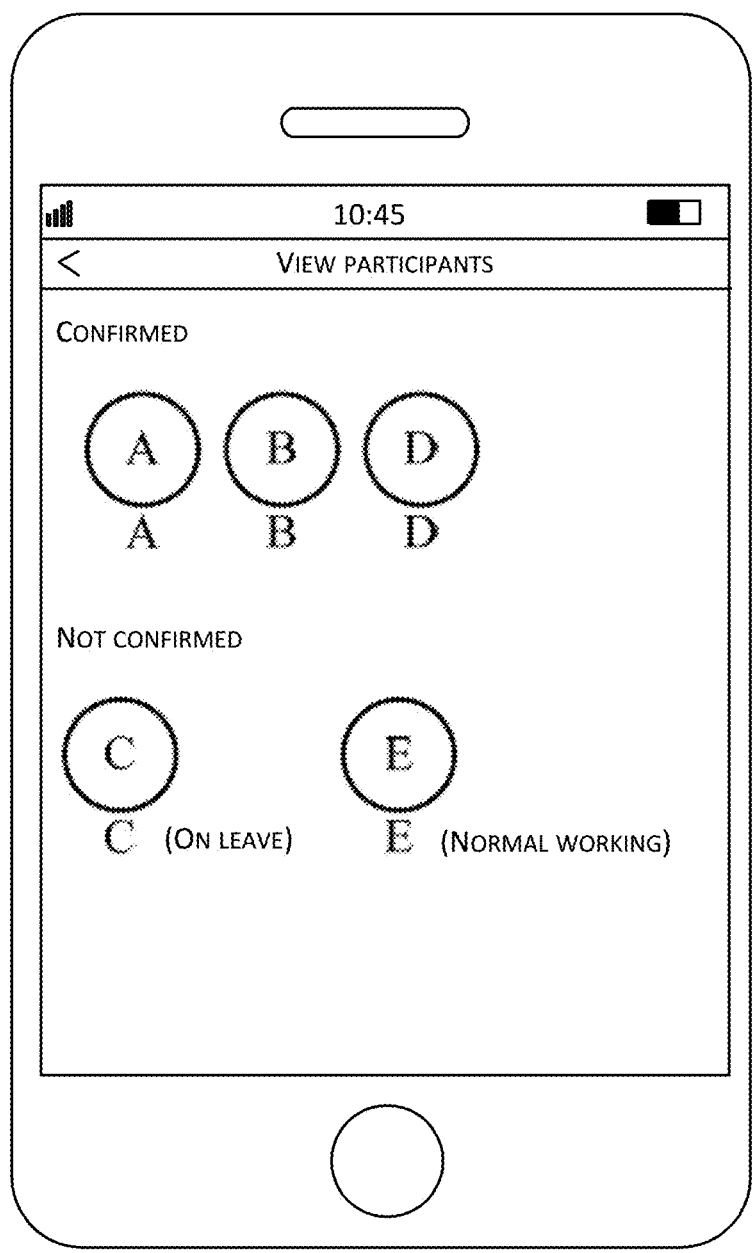
FIG. 10 is a schematic diagram of an interface displaying a work status of a company employee in accordance with an exemplary embodiment of the present application.

Specifically, as shown in FIG. 10, when the preset function page that is triggered is a page of "viewing participants", the page classifies the group members who act as the receiving parties into two categories. The company employees A, B and D belong to a "confirmed" category which indicates that reading is completed. The company employees C and E belong to an "unconfirmed" category which indicates that reading is not completed. In order to help the sending party to determine reasons about why C and E are unconfirmed, work statuses of C and E can be displayed. For example, the company employee C is "on leave", and the company employee E is "in normal working". The sending party may then need to communicate with the company employee E, to further understand a working condition thereof.

Figure 11:
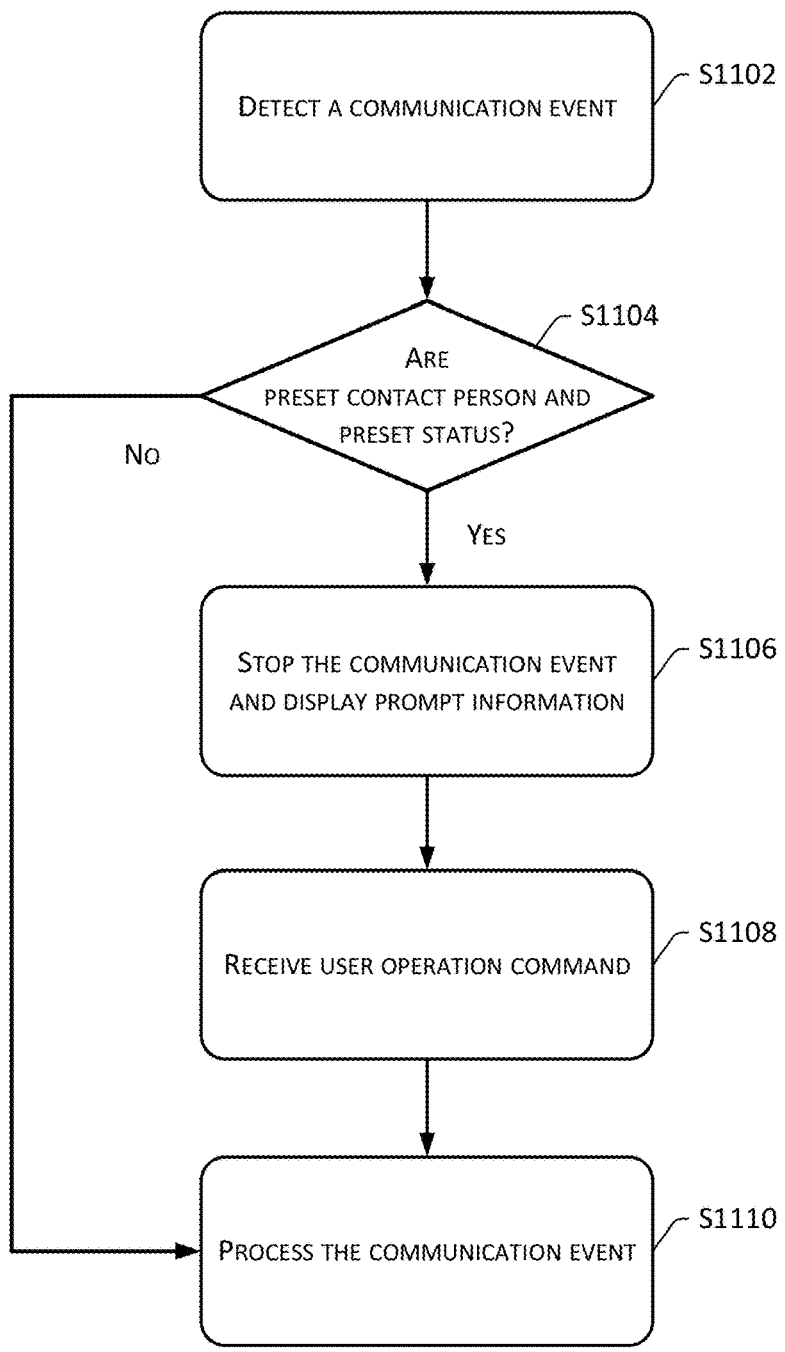
FIG. 11 is a flowchart of a method for processing a communication event based on a work status in accordance with an exemplary embodiment of the present application.

FIG. 11 is a flowchart of processing a communication event based on a work status in accordance with an exemplary embodiment of the present application. As shown in FIG. 11, the process 1100 may include the following operations.

S1102 detects that a communication event is initiated in a mobile device.

S1104 determines whether the communication event is initiated for a preset contact person, and whether a work status of the preset contact person is a preset status, and proceeds to S1106 if the communication event is initiated for the preset contact person, and whether the work status is the preset status, or proceeds to S1110 otherwise.

S1106 pauses an execution of initiating the communication event when the work status of the preset contact person is the preset status, and displays prompt information for the work status.

Figure 12:
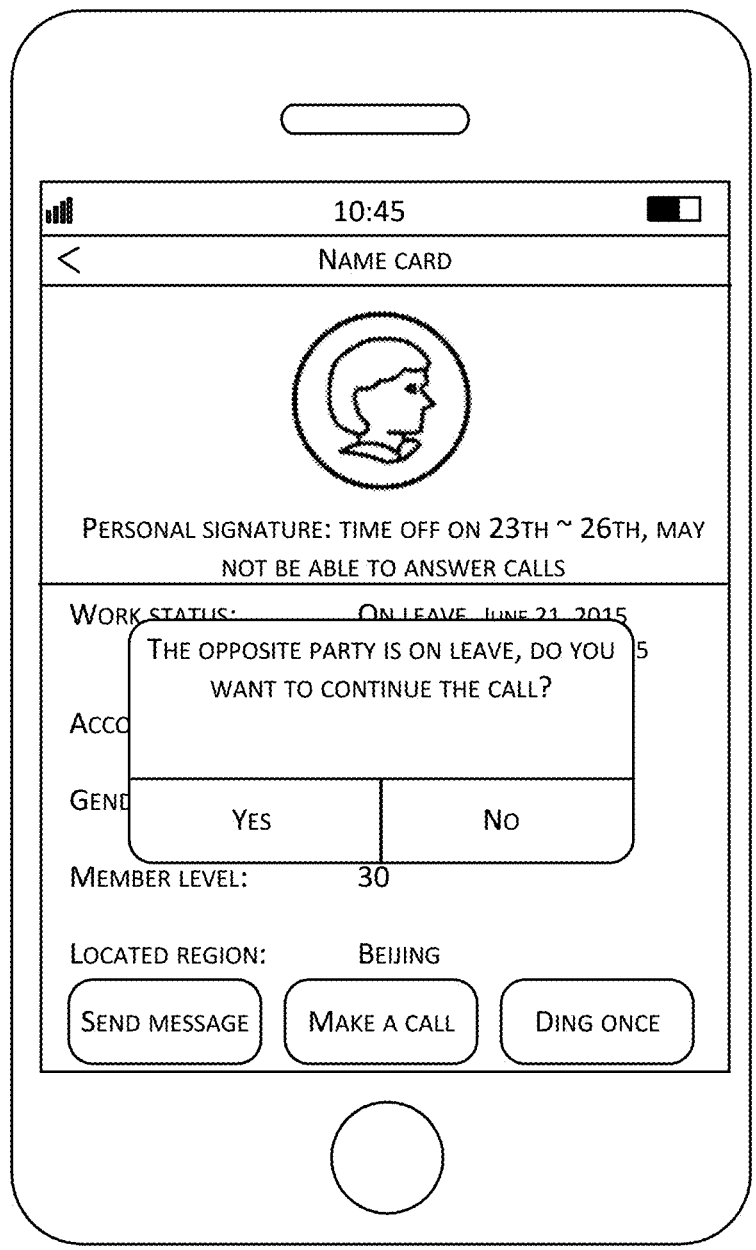
FIGS. 12-13 are schematic diagrams of interfaces associated with processing a communication event in accordance with an exemplary embodiment of the present application.

In the present embodiment, the preset status may be a default work status or any work status that is set by a user, e.g., any abnormal work status such as "on leave", "on a business trip", etc. For example, as shown in FIG. 12, when the user initiates a calling request to "Xiao Bai", the mobile device pauses an operation of calling "Xiao Bai" because "Xiao Bai" is the preset contact person and a work status thereof is the preset status of "on leave". Furthermore, by displaying prompt information "the opposite party is on leave, and is calling to be continued?" in a screen as shown in FIG. 12, for example, this prevent the user from failing to notice that initiating the current call is not suitable for the work status of the called party.

S1108 receives an operation command of a user with respect to the prompt information.

S1110 processes the communication event.

In the present embodiment, a "calling" operation is used as an example. If a called party is not a preset contact person, or a work status of the preset contact person is not a preset status, a communication event that is detected at S1102 is processed directly.

If the called party is the preset contact person and the work status of the preset contact person is the preset status, the embodiment as shown in FIG. 12 resumes the communication event that is paused at S1106 and continues to execute the calling operation when the user clicks an option of "Yes". When the user clicks an option of "No", the communication event that is paused at S1106 is terminated.

Figure 13:
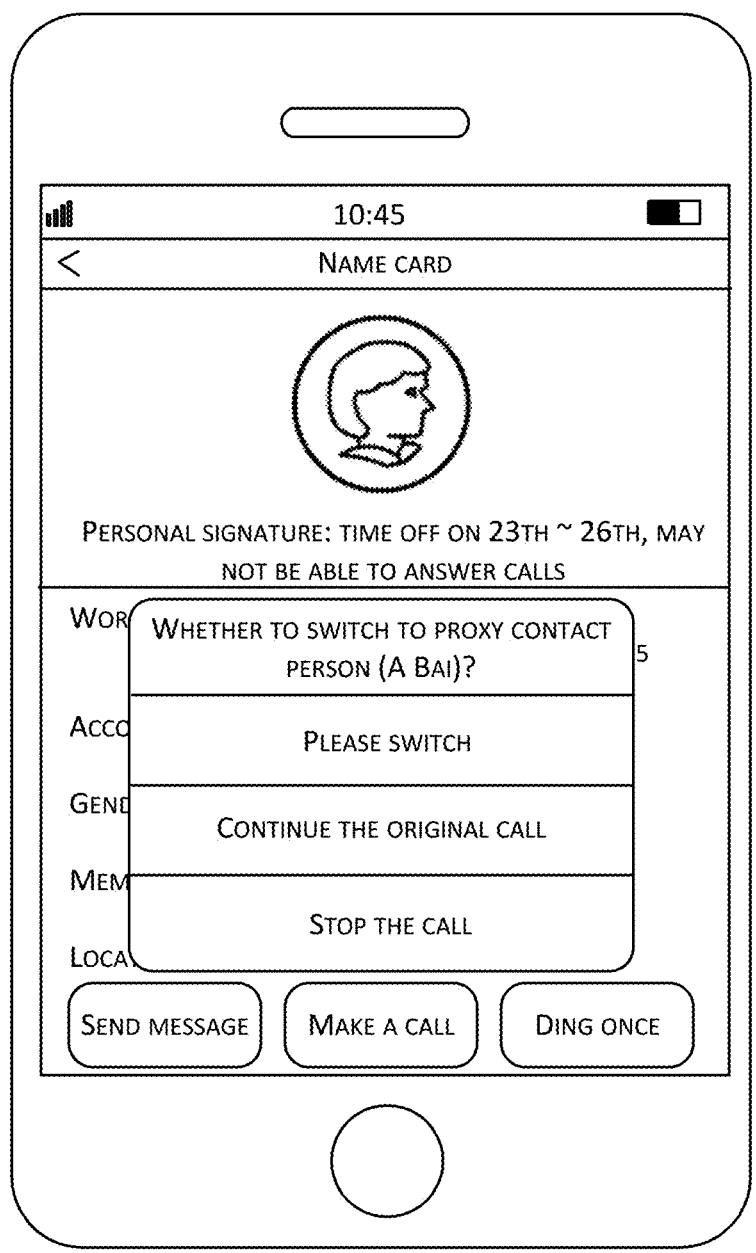

Furthermore, when the work status of the preset contact person or the supplementary information of the work status includes description information of a "proxy contact person", the description information of the proxy contact person may also be displayed at S1106. For example, "whether to switch to a proxy contact person "A Bai" that is shown in FIG. 13 represents that the preset contact person "Xiao Bai" sets up a proxy contact person "A Bai", who can handle matters such as tasks of "Xiao Bai". In this way, when the user clicks an option of "Please switch" (which indicates that an operation command of the user is to contact the proxy contact person), a communication target of the communication event is changed into the proxy contact person (the called party is changed; or in an example of "sending an email", a "recipient" is changed). Alternatively, the communication target is added with the proxy contact person (a two-party call is changed into a multi-party call conference; or in an example of "sending an email", a "recipient" or a "copying party" is added). When the user clicks an option of "Continue the original call", this indicates that the operation command of the user is to ignore the proxy contact person. As such, the communication event that is paused at operation 1106 is resumed directly. When the user clicks an option of "Terminate Calling" (this indicates that the operation command of the user is to terminal the contact), the communication event that is paused at S1106 is terminated.

Other than providing a prompt for a work status of a preset contact person by a mobile device (for example, the examples as shown in FIGS. 12 and 13), a communication event that is initiated by a user can also be monitored and processed by a server, and a corresponding prompt for a work status can be implemented. Specifically, upon receiving a communication event initiated by any user for the preset contact person, the server may return prompt information for a work status of the preset contact person to that user if the work status is a preset status.

A number of application scenarios for the embodiments are described hereinafter to facilitate understanding thereof.

1. A Scenario in Which an Instant Communication Message is Sent

Figure 14:
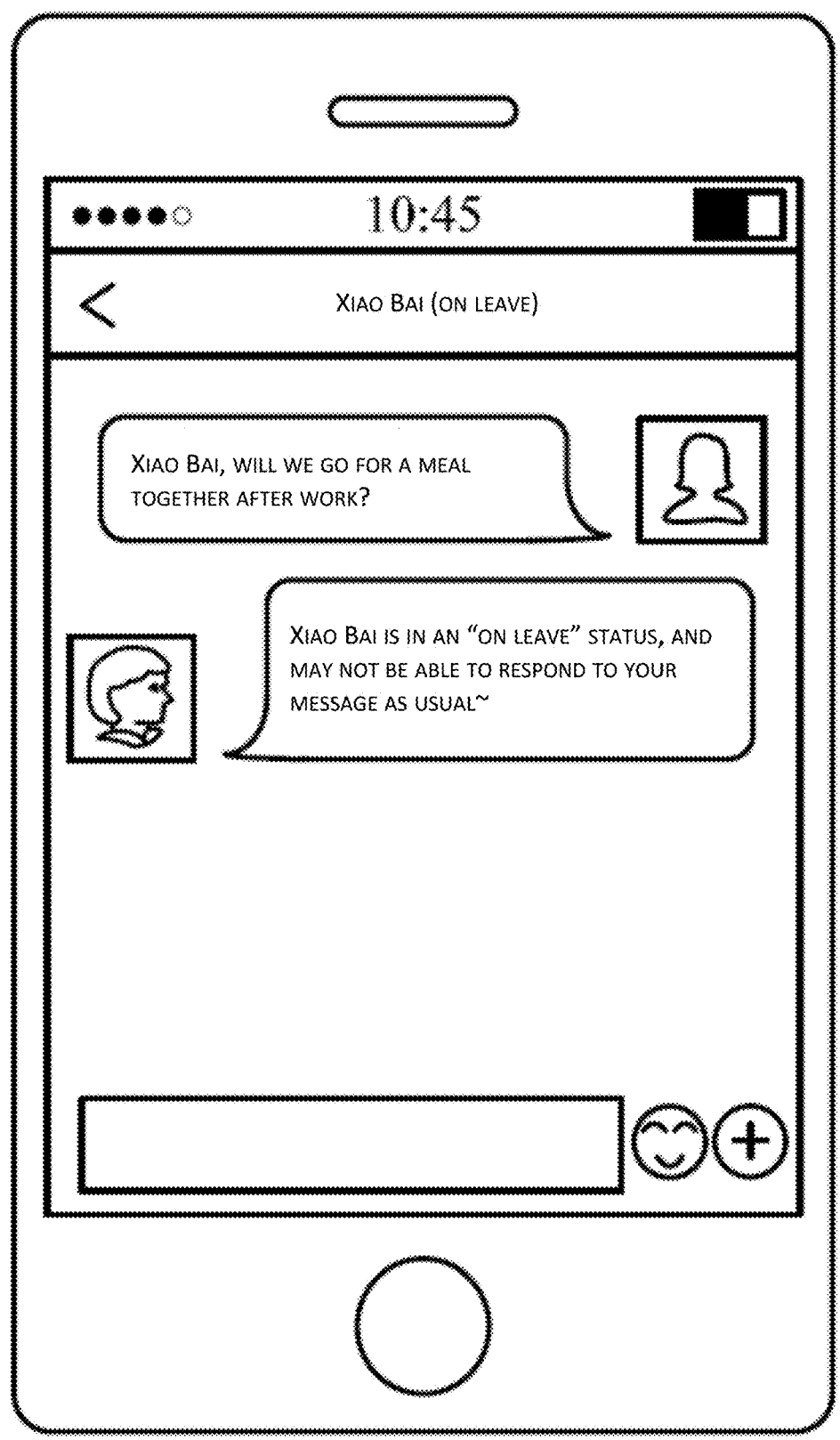
FIGS. 14-15 are schematic diagrams of other interfaces associated with processing a communication event in accordance with an exemplary embodiment of the present application.

As shown in FIG. 14, if the preset function page that is currently triggered is an interface of receiving and sending instant communication messages, a work status of a preset contact person can be represented as "on leave" through textual content such as "on leave" that follows after a name (such as "Xiao Bai" as shown in FIG. 14) of the preset contact person who acts as an information receiving party.

As such, when a user sends an instant communication message of "Xiao Bai, could we go for a meal together after work?" to "Xiao Bai", the server detects sending of this message, and detects that "Xiao Bai" is a preset contact person and a work status there of ("on leave") belongs to a preset status. In this case, the server may send a response such as prompt information of "Xiao Bai is in an "on leave" status, and may not be able to respond to your message as usual~" to an information sending party by means of an instant communication message, to further prompt the work status of "on leave" to the user.

2. A Scenario in Which an Electronic Mail is Sent

Figure 15:
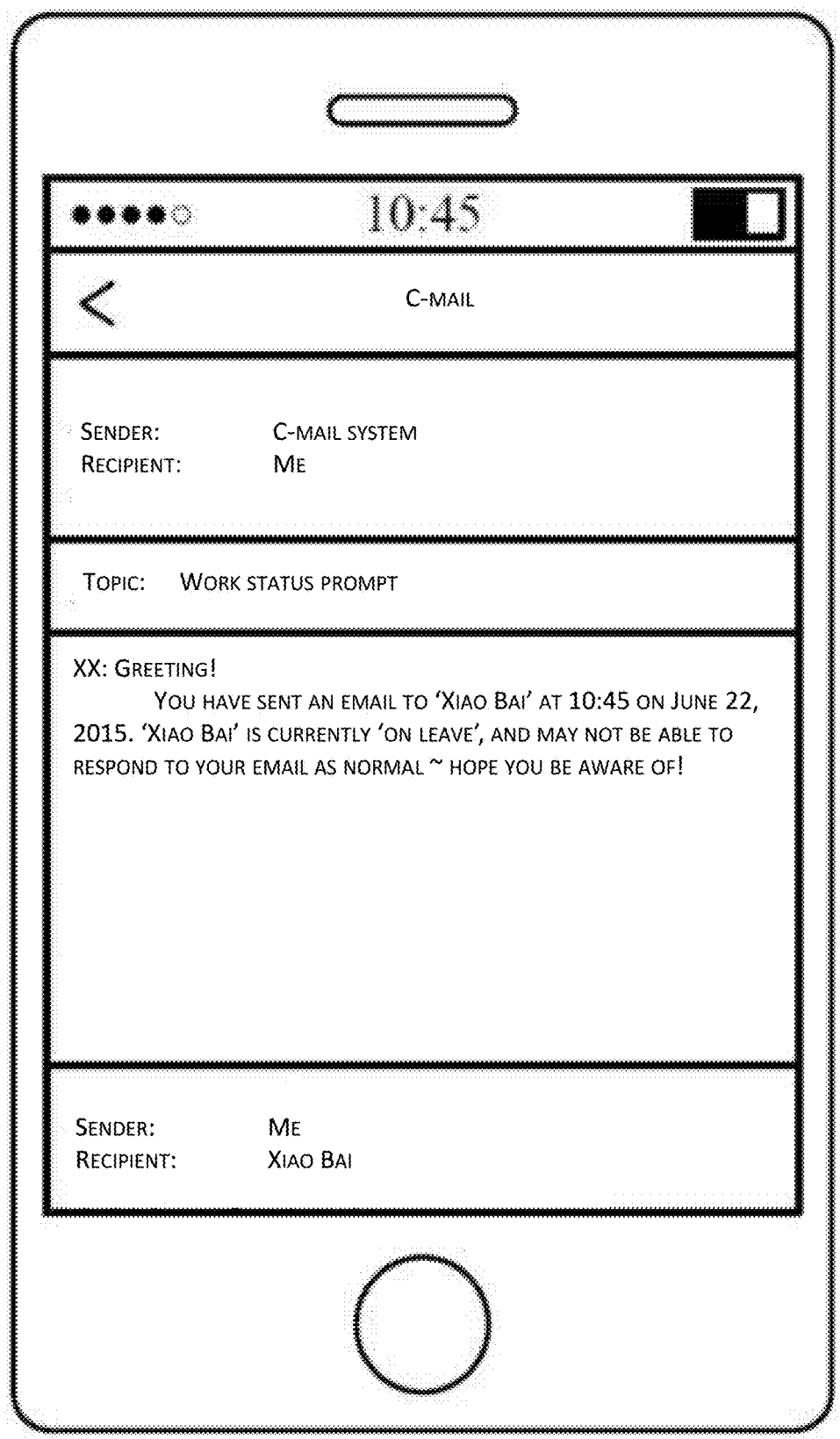

As shown in FIG. 15, if the preset function page that is currently triggered is an interface of sending and receiving an electronic mail in an instant communication application such as a "C-mail" interface in an enterprise instant communication application "DingTalk", a user can view a work status of "on leave" of a contact person "Xiao Bai" in a contact list page similar to the one shown in FIG. 9A when "Xiao Bai" is selected.

As such, when the user sends an electronic mail to "Xiao Bai", the server detects sending of this electronic mail and detects that "Xiao Bai" is a preset contact person and a work status there of ("on leave") belongs to a preset status. In this case, the server may respond with prompt information such as "XX: Greeting! You have sent an email to 'Xiao Bai' at 10:45 on Jun. 22, 2015. 'Xiao Bai' is currently 'on leave', and may not be able to respond to your email as normal~hope you be aware of!" to a sender of the electronic mail, to further prompt to the user of the "on leave" work status.

Apparently, the above embodiments may also be applied in other communication scenarios, which are not exhaustively listed herein. The present application does not have any limitation thereon.

Figure 16:
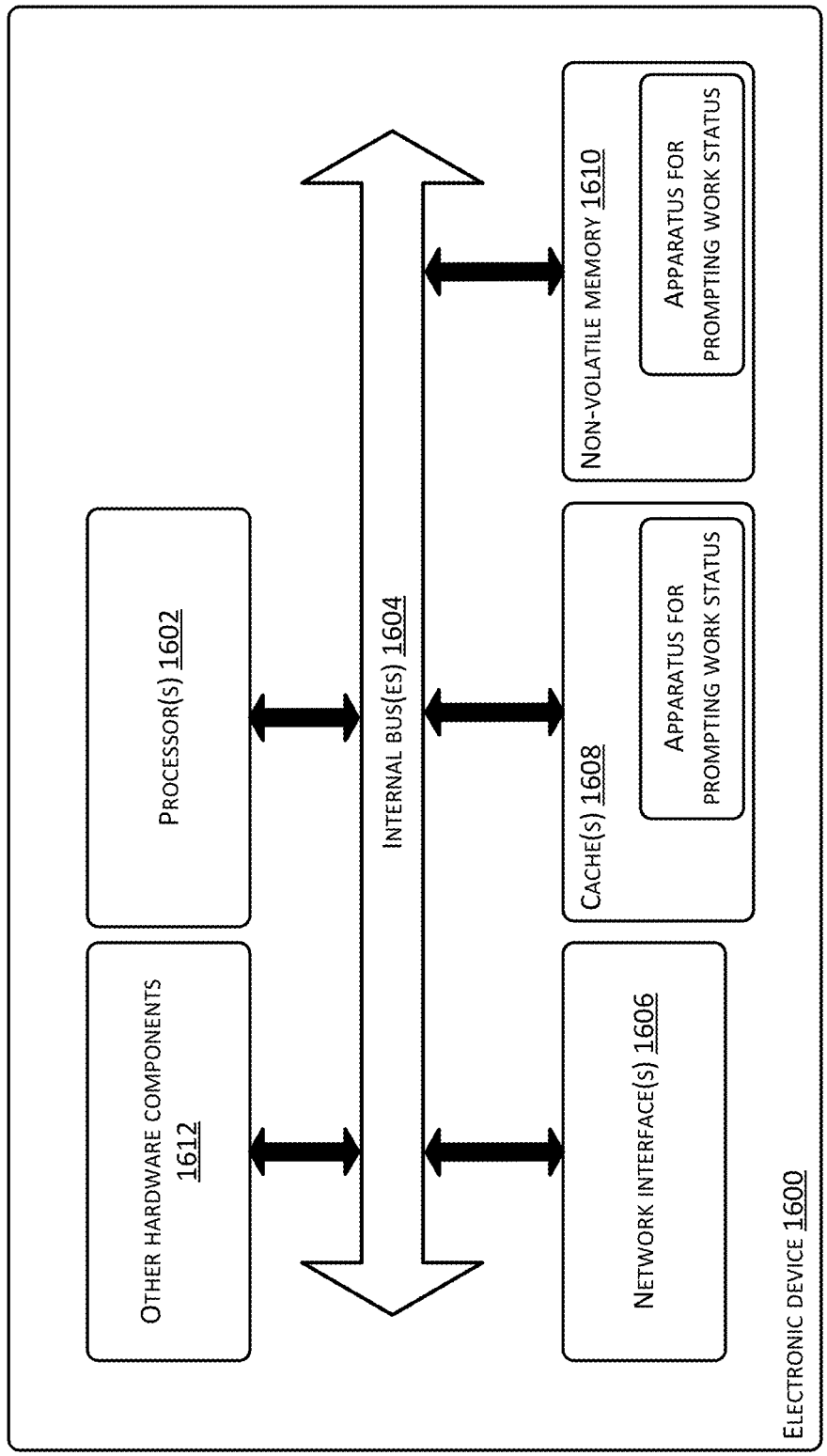
FIG. 16 is a schematic structural diagram of an electronic device in accordance with an exemplary embodiment of the present application.

FIG. 16 shows a schematic diagram of an electronic device 1600 in accordance with an exemplary embodiment of the present application. As shown in FIG. 16, in a hardware level, the electronic device 1600 may include processor(s) 1602, internal bus(es) 1604, network interface(s) 1606, cache(s) 1608, and non-volatile memory 1610, and may apparently further include other hardware components 1612 that are needed by services. The processor(s) 1602 read(s) a corresponding computer program from the non-volatile memory 1610 into the cache(s) 1608 for running, to form an apparatus for prompting a work status in a logical level. Apparently, other than software implementations, the present application does not exclude other implementations, such as logical components, or a combination of software and hardware components, etc. In other words, execution entities of the following processes are not limited to logical units, and can be hardware or logical components.

Figure 17:
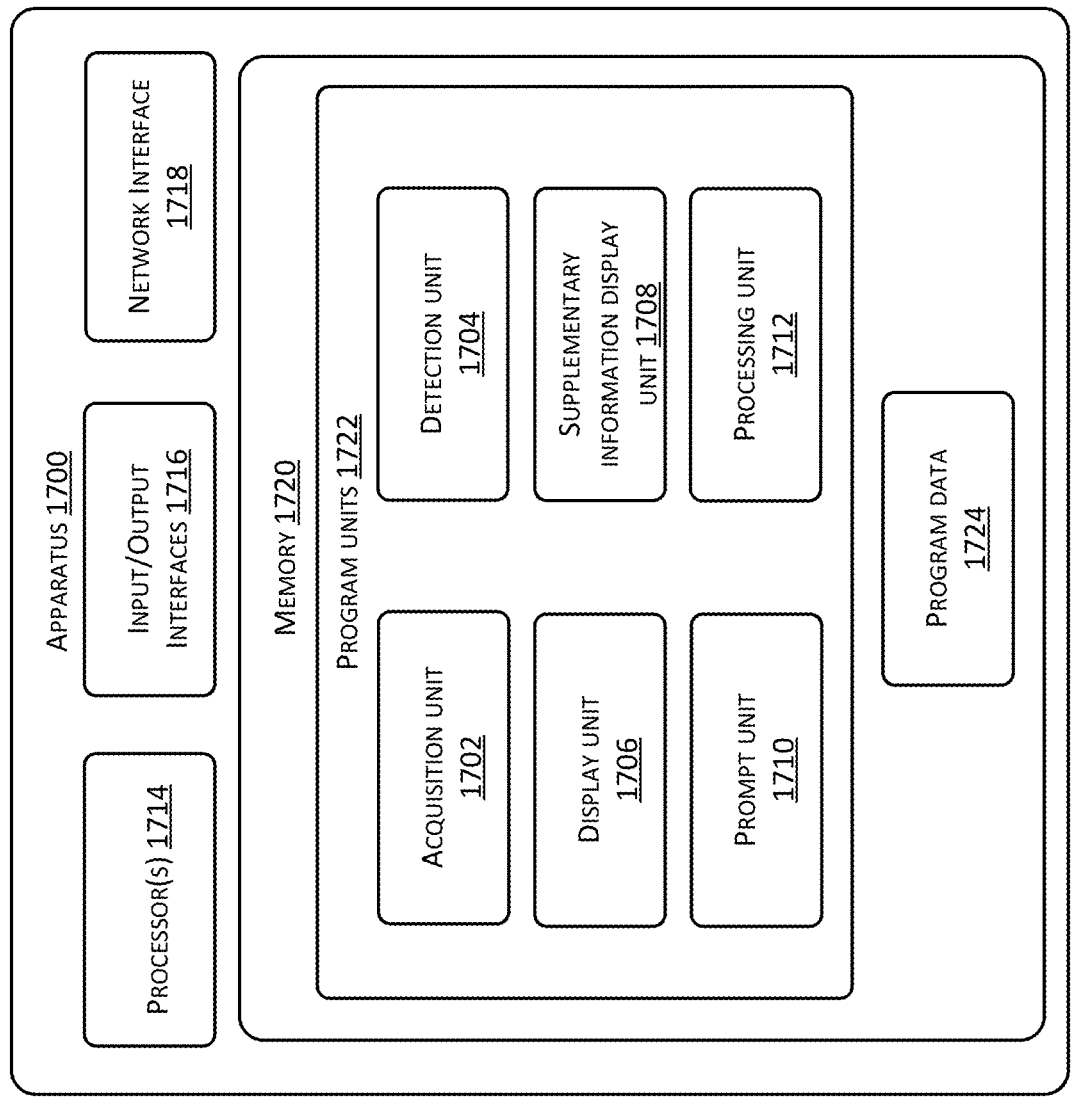
FIG. 17 is a block diagram of an apparatus for prompting a work status from a mobile device end in accordance with an exemplary embodiment of the present application.

Referring to FIG. 17, an apparatus 1700 for prompting a work status may include an acquisition unit 1702, a detection unit 1704, and a display unit 1706.

The acquisition unit 1702 obtains a work status of a preset contact person in an instant communication application.

The detection unit 1704 detects that a preset function page of the instant communication application is triggered.

The display unit 1706 displays a work status of the preset contact person in the preset function page when the preset function page is related to the preset contact person.

In implementations, the acquisition unit 1702 may further be used for obtaining corporate management events of management subsystems through preset data channels between the instant communication application and the management subsystems in a company under various dimensions, and determining the corresponding work status based on a corporate management event related to the preset contact person.

In implementations, the acquisition unit 1702 may further be used for receiving the work status of the preset contact person from a preset server, wherein the work status is obtained by the preset server based on an examination and approval result of a corporate examination and approval event initiated by the preset contact person.

In implementations, the display unit 1706 may further be used for displaying a simplified version of the work status in a region associated with the preset contact person when the preset function page is related to multiple contact persons, and displaying a detailed version of the work status in a preset region of the preset function page when the preset function page is related to the preset contact person.

In implementations, the apparatus 1700 may further include a supplementary information display unit 1708 that displays supplementary information related to the work status in the preset function page.

In implementations, the supplementary information includes at least one of the following: a time period for maintaining the status, a place of occurrence of the status, and a proxy contact person.

In implementations, the apparatus 1700 may further include a prompt unit 1710 that pauses an execution of a communication event for the preset contact person and displays prompt information for the work status in response to detecting the communication event and the work status of the preset contact person being a preset status; and a processing unit 1712 that processes the communication event based on a user operation command received for the prompt information.

In implementations, the prompt unit 1710 may further be used for displaying description information of the proxy contact person corresponding to the preset contact person, and the processing unit 1712 may further be used for changing a communication target of the communication event into the proxy contact person or adding the proxy contact person in the communication target when the user operation command is to contact the proxy contact person; resuming the communication event when the user operation command is to ignore the proxy contact person; or terminating the communication event when the user operation command is to terminate the contact.

In implementations, the apparatus 1700 may further include one or more processors 1714, an input/output (I/O) interface 1716, a network interface 1718, and memory 1720.

The memory 1720 may include a form of computer readable media such as a volatile memory, a random access memory (RAM) and/or a non-volatile memory, for example, a read-only memory (ROM) or a flash RAM. The memory 1720 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1720 may include program units 1722 and program data 1724. The program units 1722 may include one or more of the units as describe above.

In implementations, the instant communication application is an enterprise instant communication application.

Figure 18:
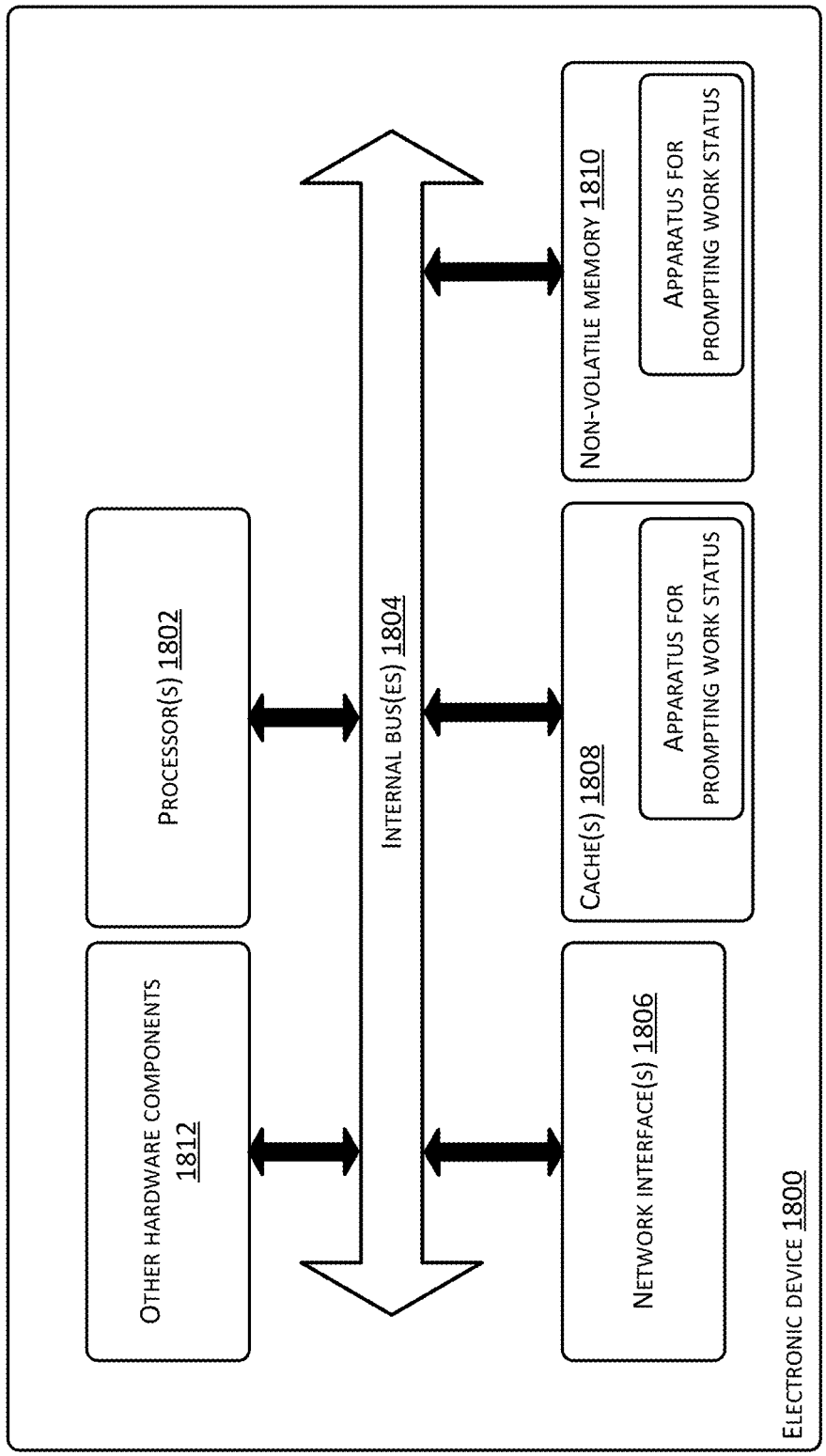
FIG. 18 is a schematic structural diagram of another electronic device in accordance with an exemplary embodiment of the present application.

FIG. 18 shows a schematic structural diagram of an electronic device 1800 in accordance with an exemplary embodiment of the present application. Referring to FIG. 18, in a hardware level, the electronic device 1800 may include processor(s) 1802, internal bus(es) 1804, network interface(s) 1806, cache(s) 1808, and non-volatile memory 1810, and may apparently further include other hardware components 1812 that are needed by services. The processor(s) 1802 read(s) a corresponding computer program from the non-volatile memory 1810 into the cache(s) 1808 for running, to form an apparatus for prompting a work status in a logical level. Apparently, other than software implementations, the present application does not exclude other implementations, such as logical components, or a combination of software and hardware components, etc. In other words, execution entities of the following processes are not limited to logical units, and can be hardware or logical components.

Figure 19:
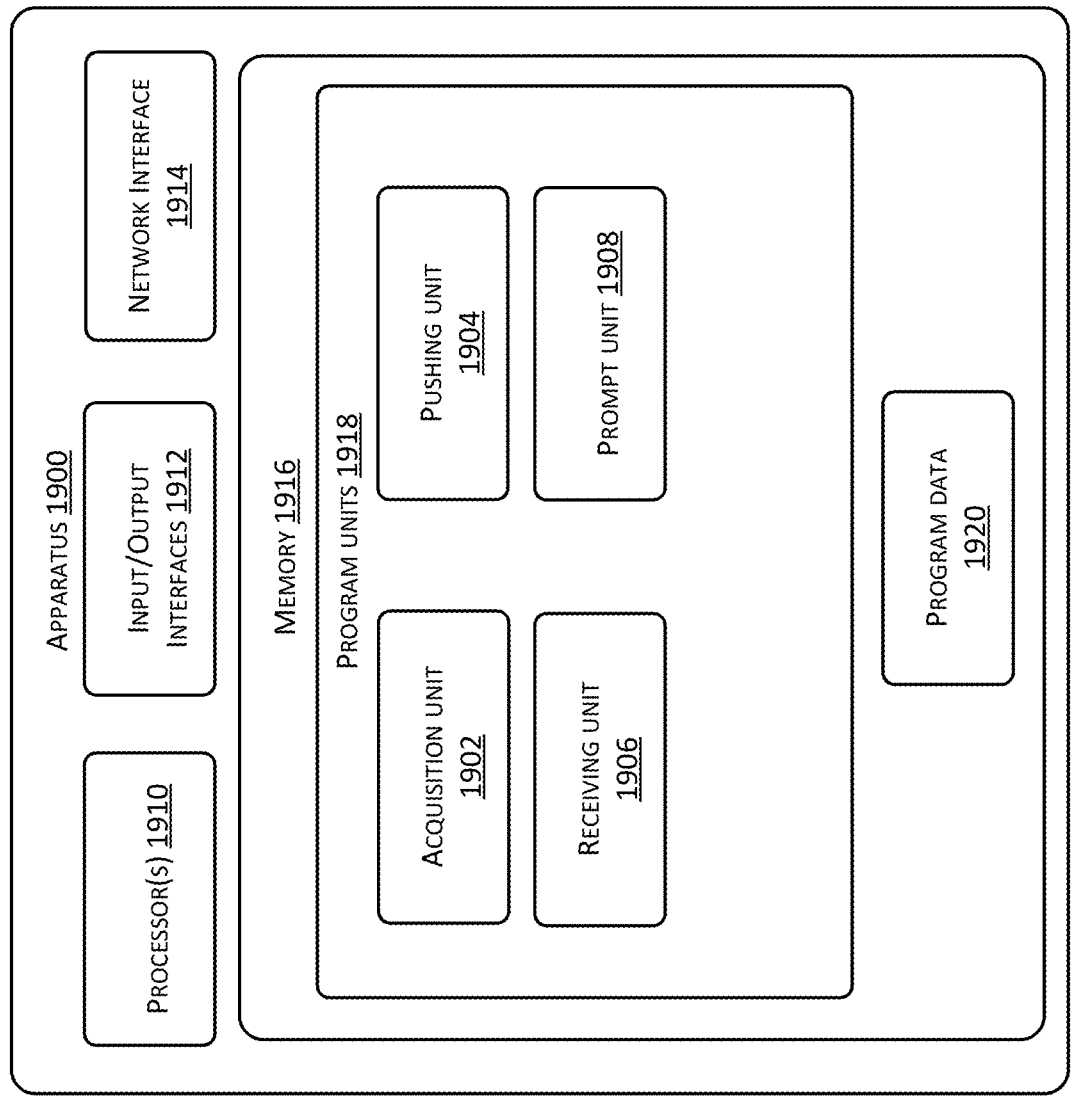
FIG. 19 is a block diagram of an apparatus for prompting a work status from a server end in accordance with an exemplary embodiment of the present application.

Referring to FIG. 19, an apparatus 1900 for prompting a work status may include an acquisition unit 1902 and a pushing unit 1904.

The acquisition unit 1902 obtains a work status of each user individually.

The pushing unit 1904 pushes, according to a preset contact person set by a particular user in an instant communication application, a work status of the preset contact person, to cause a preset function page in the instant communication application to display the work status of the preset contact person when the preset function page is triggered by the particular user.

In implementations, the acquisition unit 1902 may further be used for obtaining corporate management events of management subsystems through predefined data channels with the management subsystems of a company under various dimensions, and determining the respective work status based on a corporate management event related to each user.

In implementations, the acquisition unit 1902 may further be used for determining the corresponding work status based on an examination and approval result of a company examination and approval event initiated by each user.

In implementations, the apparatus 1900 may further include a receiving unit 1906 that receives a communication event initiated by the particular user for the preset contact person; and a prompt unit 1908 that returns prompt information of the work status to the particular user when the work status of the preset contact person is a preset status.

In implementations, the apparatus 1900 may further include one or more processors 1910, an input/output (I/O) interface 1912, a network interface 1914, and memory 1916.

The memory 1916 may include a form of computer readable media such as a volatile memory, a random access memory (RAM) and/or a non-volatile memory, for example, a read-only memory (ROM) or a flash RAM. The memory 1916 is an example of a computer readable media.

In implementations, the memory 1916 may include program units 1918 and program data 1920. The program units 1918 may include one or more of the units as describe above.

In a typical configuration, a computing device includes one or more processors (CPU), input/output interface(s), network interface(s), and memory.

The memory may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

It should be further noted that terms such as "include", "comprise" or other variations thereof are intended to cover non-exclusive inclusion, so that a process, method, product or device including a series of elements not only includes the elements, but also includes other elements not explicitly listed, or further includes inherent elements of the process, method, product or device. Without further restrictions, an element defined by a phrase "include a/an . . . " does not exclude other same elements to exist in a process, method, product, or device that includes the element.

The foregoing description merely describes relatively better embodiments of the present application, which are not used for limiting the present application. All modifications, equivalent replacements, and improvements, etc., that are made within the spirit and principles of the present application, should all be included in the scope of protection of the present application.

The invention claimed is:

1. A method implemented by one or more computing devices, the method comprising:
    obtaining a work status of a preset contact person in an instant communication application including:
        obtaining corporate management events from a plurality of management subsystems of a company, the corporate management events being associated with the preset contact person; and analyzing the corporate management events to determine the work status of the preset contact person, the work status including at least one of normal working, on a business trip, and on vacation;

detecting that a preset function page of the instant communication application is triggered related to the preset contact person;

presenting the work status of the preset contact person in the preset function page when the preset function page is related to the preset contact person; and displaying supplementary information related to the work status in the preset function page, wherein the supplementary information includes a proxy contact person corresponding to the preset contact person when the work status of the preset contact person includes at least one of on a business trip or on vacation.

2. The method of claim 1, wherein the corporate management events are obtained from the plurality of management subsystems of the company through predefined data channels between the instant communication application and the plurality of management subsystems under a plurality of dimensions.

3. The method of claim 1, wherein obtaining the work status of the preset contact person in the instant communication application comprises receiving the work status of the preset contact person from a preset server, wherein the work status is obtained by the preset server based on an examination and approval result of a company examination and approval event initiated by the preset contact person.

4. The method of claim 1, wherein presenting the work status of the preset contact person in the preset function page when the preset function page is related to the preset contact person comprises:

displaying a simplified version of the work status in an associated region of the preset contact person when the preset function page is related to two or more of the plurality of contact persons; and displaying a detailed version of the work status in a preset region of the preset function page when the preset function page is related to the preset contact person.

5. The method of claim 1, wherein the supplementary information further comprises at least one of: a time for maintaining the status, or a place of occurrence of the status.

6. The method of claim 1, further comprising:

pausing an execution of a communication event for the preset contact person and displaying prompt information for the work status when detecting that the communication event and the work status of the preset contact person is a preset status, the preset status including at least one of on a business trip or on vacation; and processing the communication event based on a user operation command that is received for the prompt information.

7. The method of claim 6, wherein:

the prompt information displayed for the work status comprises description information of the proxy contact person corresponding to the preset contact person, and processing the communication event based on the user operation command that is received for the prompt information comprises:

changing a communication target of the communication event to the proxy contact person or adding the proxy contact person into the communication target when the user operation command is to contact the proxy contact person, resuming the communication event when the user operation command is to ignore the proxy contact person, or terminating the communication event when the user operation command is to stop a contact.

8. The one or more computer-readable media of claim 1, wherein the supplementary information further comprises at least one of: a time for maintaining the status, or a place of occurrence of the status.

9. One or more computer-readable media storing executable instructions that, when executed by one or more processors, cause the one or more processors to perform acts comprising:

obtaining a work status of a preset contact person in an instant communication application including:

obtaining corporate management events from a plurality of management subsystems of a company, the corporate management events being associated with the preset contact person; and analyzing the corporate management events to determine the work status of the preset contact person, the work status including at least one of normal working, on a business trip, and on vacation;

detecting that a preset function page of the instant communication application is triggered related to the preset contact person;

presenting the work status of the preset contact person in the preset function page when the preset function page is related to the preset contact person; and displaying supplementary information related to the work status in the preset function page, wherein the supplementary information includes a proxy contact person corresponding to the preset contact person when the work status of the preset contact person includes at least one of on a business trip or on vacation.

10. The one or more computer-readable media of claim 9, wherein the corporate management events are obtained from the plurality of management subsystems of the company through predefined data channels between the instant communication application and the plurality of management subsystems under a plurality of dimensions.

11. The one or more computer-readable media of claim 9, wherein obtaining the work status of the preset contact person in the instant communication application comprises receiving the work status of the preset contact person from a preset server, wherein the work status is obtained by the preset server based on an examination and approval result of a company examination and approval event initiated by the preset contact person.

12. The one or more computer-readable media of claim 9, wherein presenting the work status of the preset contact person in the preset function page when the preset function page is related to the preset contact person comprises:

displaying a simplified version of the work status in an associated region of the preset contact person when the preset function page is related to two or more of the plurality of contact persons; and displaying a detailed version of the work status in a preset region of the preset function page when the preset function page is related to the preset contact person.

13. The one or more computer-readable media of claim 9, the acts further comprising:

pausing an execution of a communication event for the preset contact person and displaying prompt information for the work status when detecting that the communication event and the work status of the preset contact person is a preset status, the preset status including at least one of on a business trip or on vacation; and processing the communication event based on a user operation command that is received for the prompt information.

14. The one or more computer-readable media of claim 13, wherein:

the prompt information displayed for the work status comprises description information of the proxy contact person corresponding to the preset contact person, and processing the communication event based on the user operation command that is received for the prompt information comprises:

changing a communication target of the communication event to the proxy contact person or adding the proxy contact person into the communication target when the user operation command is to contact the proxy contact person, resuming the communication event when the user operation command is to ignore the proxy contact person, or terminating the communication event when the user operation command is to stop a contact.

15. The one or more computer-readable media of claim 13, wherein the prompt information displayed for the work status comprises description information of the proxy contact person corresponding to the preset contact person, and processing the communication event based on the user operation command that is received for the prompt information comprises:

changing a communication target of the communication event to the proxy contact person or adding the proxy contact person into the communication target when the user operation command is to contact the proxy contact person, resuming the communication event when the user operation command is to ignore the proxy contact person, or terminating the communication event when the user operation command is to stop a contact.

16. An apparatus comprising:

one or more processors;

memory;

an acquisition unit stored in the memory and executable by the one or more processors that individually obtains a work status of a preset contact person including:

obtaining corporate management events from a plurality of management subsystems of a company, the corporate management events being associated with the preset contact person; and analyzing the corporate management events to determine the work status of the preset contact person, the work status including at least one of normal working, on a business trip, and on vacation; and a pushing unit stored in the memory and executable by the one or more processors that, according to a preset contact person that is set by a user in an instant communication application, pushes the work status of the preset contact person to the user, to enable a preset function page in the instant communication application to present the work status of the preset contact person and to display supplementary information related to the work status in the preset function page when the preset function page is triggered related to the preset contact person, wherein the supplementary information includes a proxy contact person corresponding to the preset contact person when the work status of the preset contact person includes at least one of on a business trip or on vacation.

17. The apparatus of claim 16, wherein the corporate management events are obtained from the plurality of management subsystems of the company under a plurality of dimensions through predefined data channels with the plurality of management subsystems.

18. The apparatus of claim 16, wherein the work status is determined based on an examination and approval result of a company examination and approval event initiated by the preset contact person.

19. The apparatus of claim 16, further comprising:

a receiving unit stored in the memory and executable by the one or more processors to receive a communication event that is initiated by a particular user for the preset contact person; and a prompt unit stored in the memory and executable by the one or more processors to pause an execution of the communication event for the preset contact person and return prompt information of the work status to the particular user when the work status of the preset contact person is a preset status, the preset status including at least one of on a business trip or on vacation.

20. The apparatus of claim 19, wherein the prompt information comprises description information of the proxy contact person corresponding to the preset contact person, and the apparatus further comprises a processing unit stored in the memory and executable by the one or more processors to process the communication event based on a user operation command that is received for the prompt information comprising:

changing a communication target of the communication event to the proxy contact person or adding the proxy contact person into the communication target when the user operation command is to contact the proxy contact person, resuming the communication event when the user operation command is to ignore the proxy contact person, or terminating the communication event when the user operation command is to stop a contact.

* * * * *